(12) United States Patent
Gong et al.

(10) Patent No.: US 10,601,496 B2
(45) Date of Patent: *Mar. 24, 2020

(54) METHOD, APPARATUS AND SYSTEM OF PROVIDING COMMUNICATION COVERAGE TO AN UNMANNED AERIAL VEHICLE

(71) Applicant: SZ DJI TECHNOLOGY CO., LTD., Shenzhen (CN)

(72) Inventors: Ming Gong, Shenzhen (CN); Wei Fan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/031,338

(22) Filed: Jul. 10, 2018

(65) Prior Publication Data
US 2018/0323862 A1 Nov. 8, 2018

Related U.S. Application Data

(63) Continuation of application No. 15/274,333, filed on Sep. 23, 2016, now Pat. No. 10,038,492, which is a
(Continued)

(51) Int. Cl.
*H04B 7/185* (2006.01)
*H04W 40/02* (2009.01)
(Continued)

(52) U.S. Cl.
CPC ....... *H04B 7/18506* (2013.01); *B64C 39/024* (2013.01); *G05D 1/0022* (2013.01);
(Continued)

(58) Field of Classification Search
CPC .. H04B 7/18506; H04W 16/18; H04W 40/02; B64C 39/024; B64C 2201/122; B64C 2201/146; G05D 1/0022
See application file for complete search history.

(56) References Cited

U.S. PATENT DOCUMENTS

| 6,002,796 A | 12/1999 | Kawa et al. |
| 7,006,816 B2 | 2/2006 | Remy |

(Continued)

FOREIGN PATENT DOCUMENTS

| CN | 102201865 A | 9/2011 |
| CN | 102298799 A | 12/2011 |

(Continued)

OTHER PUBLICATIONS

The World Intellectual Property Organization (WIPO) International Search Report for PCT/CN2015/076335 dated Jan. 13, 2016 4 Pages.
(Continued)

*Primary Examiner* — Dominic E Rego
(74) *Attorney, Agent, or Firm* — Anova Law Group, PLLC

(57) ABSTRACT

A method of providing communication coverage includes collecting a location of an unmanned aerial vehicle (UAV) while the UAV is in flight, determining a communication signal distribution in a proximity of the UAV, and determining one or more locations for arranging one or more relays based on the communication signal distribution to improve communication signal coverage along a flight path of the UAV.

18 Claims, 14 Drawing Sheets

Related U.S. Application Data continuation of application No. PCT/CN2015/076335, filed on Apr. 10, 2015.

(51) Int. Cl.
  *G05D 1/00* (2006.01)
  *B64C 39/02* (2006.01)
  *H04W 16/18* (2009.01)

(52) U.S. Cl.
  CPC ........... *H04W 16/18* (2013.01); *H04W 40/02* (2013.01); *B64C 2201/122* (2013.01); *B64C 2201/146* (2013.01)

(56) References Cited

U.S. PATENT DOCUMENTS

| | | | |
|---|---|---|---|
| 7,257,417 B1* | 8/2007 | Krasner | G01P 3/50 |
| | | | 342/357.68 |
| 7,586,514 B1 | 9/2009 | Salazar et al. | |
| 7,948,404 B2 | 5/2011 | Tran | |
| 8,358,967 B1 | 1/2013 | Rebolledo et al. | |
| 8,509,140 B2 | 8/2013 | Kauffman | |
| 8,600,587 B1 | 12/2013 | Seah et al. | |
| 8,979,032 B1 | 3/2015 | Hester et al. | |
| 9,049,740 B1 | 6/2015 | Tillotson et al. | |
| 9,483,951 B1 | 11/2016 | McCusker | |
| 9,646,582 B2 | 5/2017 | Di Cicco | |
| 2002/0037719 A1 | 3/2002 | Ariga et al. | |
| 2003/0236829 A1* | 12/2003 | Yasugi | H04L 29/06 |
| | | | 709/203 |
| 2005/0064864 A1* | 3/2005 | Horton | H04W 16/18 |
| | | | 455/423 |
| 2005/0197749 A1 | 9/2005 | Nichols et al. | |
| 2007/0087695 A1 | 4/2007 | Cohen et al. | |
| 2008/0004016 A1* | 1/2008 | Smee | H04B 7/0491 |
| | | | 455/435.1 |
| 2009/0157288 A1 | 6/2009 | Bailey et al. | |
| 2009/0326735 A1 | 12/2009 | Wood et al. | |
| 2010/0121574 A1* | 5/2010 | Ariyur | G05D 1/101 |
| | | | 701/301 |
| 2010/0279647 A1 | 11/2010 | Jacobs et al. | |
| 2011/0180667 A1* | 7/2011 | O'Brien | B64C 39/022 |
| | | | 244/135 R |
| 2011/0222465 A1 | 9/2011 | Arashin et al. | |
| 2011/0320068 A1 | 12/2011 | Lee et al. | |
| 2012/0057489 A1 | 3/2012 | Shiotsuki et al. | |
| 2012/0165006 A1 | 6/2012 | Ge et al. | |
| 2012/0309288 A1 | 12/2012 | Lu | |
| 2013/0200207 A1 | 8/2013 | Pongratz et al. | |
| 2014/0031078 A1 | 1/2014 | Nishikawa | |
| 2014/0032021 A1* | 1/2014 | Metzler | G01S 5/0036 |
| | | | 701/3 |
| 2014/0135019 A1 | 5/2014 | Jang et al. | |
| 2014/0142787 A1 | 5/2014 | Tillotson et al. | |
| 2014/0321024 A1 | 10/2014 | Smoot | |
| 2014/0323038 A1 | 10/2014 | Hubbell et al. | |
| 2014/0327733 A1 | 11/2014 | Wagreich | |
| 2014/0327770 A1 | 11/2014 | Wagreich | |
| 2016/0068264 A1* | 3/2016 | Ganesh | G08G 5/0069 |
| | | | 701/2 |
| 2016/0189549 A1 | 6/2016 | Marcus | |
| 2016/0284222 A1 | 9/2016 | Nicholls et al. | |
| 2016/0292869 A1 | 10/2016 | Hammond et al. | |
| 2017/0083979 A1 | 3/2017 | Winn et al. | |
| 2017/0222712 A1 | 8/2017 | Chang | |
| 2019/0006749 A1* | 1/2019 | Mack | H01Q 1/1257 |

FOREIGN PATENT DOCUMENTS

| | | |
|---|---|---|
| CN | 102628963 A | 8/2012 |
| CN | 103595457 A | 2/2014 |
| CN | 103684571 A | 3/2014 |
| CN | 204068025 U | 12/2014 |
| CN | 204168292 U | 2/2015 |

OTHER PUBLICATIONS

Pinkney M. F. J. et al., Unmanned Aerial Vehicle (UAV) Communications Relay, Military Communications Conference, Oct. 24, 1996, pp. 47-51, vol. 1.

* cited by examiner

METHOD, APPARATUS AND SYSTEM OF PROVIDING COMMUNICATION COVERAGE TO AN UNMANNED AERIAL VEHICLE

CROSS-REFERENCE

This application is a continuation of application Ser. No. 15/274,333, filed on Sep. 23, 2016, which is a continuation of International Application No. PCT/CN2015/076335, filed on Apr. 10, 2015, the entire contents of both of which are incorporated herein by reference.

BACKGROUND

Aerial vehicles, such as unmanned aerial vehicles (UAVs), have been developed for a wide range of applications including surveillance, search and rescue operations, exploration, and other fields. Such UAVs can carry onboard cameras to capture still images and video images.

It may be desirable for the UAV to have a continuous access to a user terminal or a network during the flight. The user terminal may be a remote controller or a ground terminal. However, a conventional dedicated link between the UAV and user terminal may not guarantee a stable and continuous communication during the whole flight.

SUMMARY

Systems and methods are provided for providing communication coverage to a UAV by disposing relays based on a flight plan of the UAV. In traditional UAV communication systems, a dedicated link may be established between the UAV and user terminals such as a remote controller or a ground station. However, a quality and safety of communication over this dedicated link may not be guarantee due to the fact that an un-licensed frequency band is employed. Furthermore, the traditional UAV communication systems may not benefit from the rapid development of cellular communication such as 4G (i.e., the fourth generation of mobile communications technology) because a strength of cellular signal may rapidly deteriorate above a certain altitude in the air, leading to an unstable communication between the UAV and user terminals over cellular network. Accordingly, a need exists for providing a stable and continuous communication between the UAV and user terminals during the entire flight path of UAV.

The systems and methods may collect a proposed flight path of a UAV, and determine a communication signal distribution, such as a cellular signal distribution, along the proposed flight of the UAV. At positions having low or no cellular signal, relays may be provided to improve a quality of the cellular signal. In some embodiments, the relay may comprise a first communication unit, such as a Wi-Fi unit, capable of directly communicating with the UAV and a second communication unit, such as a cellular unit, capable of communicating over a communication network. If the UAV is equipped with a cellular unit, at positions having good cellular signal, the UAV may directly communicate with a communication network using a cellular signal. At positions having bad or no cellular signal, the UAV may communicate with the relay over Wi-Fi, and then the relay may forward the communication from UAV to the communication network using cellular signal. On the other hand, if the UAV is not equipped with a cellular unit, the UAV may communicate with the relay over Wi-Fi, and then the relay may forward the communication from UAV to the communication network using a cellular signal. In some embodiments, the relays may be stationary relays. Alternatively, the relays may be movable relays, such as other UAVs having a Wi-Fi unit and a cellular unit. With the systems and methods of present disclosure, a stable and continuous communication between the UAV and user terminals during the entire flight path of UAV, and a coverage of cellular signal may be expanded.

Communications from a UAV may be relayed by receiving, at a first communication unit such as a Wi-Fi unit of a relay, a wireless signal directly from the UAV, and then transmitting, via a second communication unit such as a cellular unit of the relay, the received wireless signal to a communication network. In some embodiments, the wireless signal may comprise digital files such as multi-media information captured by the UAV. A wireless signal data may be received from UAV and transmitted over the communication network in a rapid and stable way during the entire flight path of UAV, regardless of a distribution of the cellular signal.

Communications from a communication network may be relayed by receiving, at a second communication unit such as a cellular unit of a relay, a communication signal from a public network, and then transmitting, via a first communication unit such as a Wi-Fi unit of the relay, the received communication signal to the UAV. In some embodiments, the communication signal may comprise an operation command of the UAV which is input by the user through a remote controller. With the systems and methods of present disclosure, a communication signal may be received from a remote controller over the communication network and transmitted to the UAV in a rapid and stable way during the entire flight path of UAV, regardless of a distribution of the cellular signal.

An aspect of the disclosure may include a method of providing communication coverage to an unmanned aerial vehicle (UAV), the method comprising: collecting a proposed flight path of the UAV; determining a communications signal distribution along the proposed flight path of the UAV; and determining one or more locations for providing one or more relays based on the communication signal distribution to improve communication signal distribution along the proposed flight path of the UAV.

Aspects of the disclosure may further include an apparatus for providing communication coverage to an unmanned aerial vehicle (UAV), the system comprising: one or more processors configured to, individually or collectively: collect a proposed flight path of the UAV; determine a communication signal distribution along the proposed flight path of the UAV; and generate signals for providing one or more relays at one or more locations based on the communications signal distribution to improve communication signal distribution along the proposed flight path of the UAV. In some embodiments, the apparatus may be an aerial vehicle such as another UAV.

Aspects of the disclosure may further include a system for providing communication coverage to an unmanned aerial vehicle (UAV), the system comprising: an aerial vehicle configured to collect a communications signal distribution along a proposed flight path of the UAV; and a device configured to determine one or more locations for providing one or more relay devices based on the communications signal distribution to improve communication signal distribution along the proposed flight path of the UAV.

In some embodiments, determining the communication signal distribution along the proposed flight path may include detecting one or more areas where a quality of communication signal falls beneath a threshold value. The threshold value may vary for the one or more areas. Alternatively, determining the communication signal distribution may include flying another aerial vehicle along the proposed flight path to collect the communication signal distribution. Alternatively, determining the communication signal distribution may include incorporating past experience data collective from other UAVs. Alternatively, determining the communication signal distribution may include incorporating past experience data collective from a communication service provider or receiving a preset setting of a communication service provider. Alternatively, determining the communication signal distribution includes determining the communication signal distribution based on real-time notice from a communication service provider. Optionally, determining the communications signal distribution may include detecting a quality of telecommunication network signal along the proposed flight path of the UAV.

In some embodiments, determining one or more locations for providing one or more relays may include determining one or more locations where a quality of communication signal exceeds a threshold value.

In some embodiments, each of the one or more relays comprises (1) a first communication unit capable of directly communicating with the UAV and (2) a second communication unit capable of communicating over a telecommunication network. In some instances, a plurality of the relays may communicate with each other via the second communication units. In some instances, a communication between the UAV and the plurality of relays may switch among the plurality of the relays.

In some embodiments, the first communication unit may be a wireless transceiver dedicated to communication between the UAV and the relay device. In some instances, the wireless transceiver may be a Wi-Fi transceiver. Optionally, the wireless transceiver may be a private wireless transceiver. Optionally, the wireless transceiver may be a radio frequency transceiver. In some instances, the wireless transceiver may directly communicate with a remote controller comprising a communication unit capable of directly communicating with the wireless transceiver.

In some embodiments, the first communication unit may be capable of receiving a signal directly from the UAV. In some instances, the signal may include information about a multimedia file captured by the UAV. Optionally, the signal may include sensor data collected by one or more sensors onboard the UAV. Alternatively, first communication unit may be capable of transmitting a signal directly to the UAV. In some instances, the signal includes one or more commands that affect operation of the UAV. For instance, the one or more commands may affect flight of the UAV or operation of a payload of the UAV. The one or more commands may originate from a remote controller configured to accept a user input.

In some embodiments, the second communication unit may be a cellular communication unit. In some instances, the cellular communication unit may be configured to communicate with a remote controller over the telecommunications network. Optionally, the cellular communication unit may be configured to receive one or more commands that effect operation of the UAV. Optionally, the cellular communication unit may be configured to receive one or more commands that effect operation of the UAV. Optionally, the cellular communication unit may be configured to transmit information about a multimedia file captured by the UAV. Optionally, the cellular communication unit may be configured to transmit sensor data collected by one or more sensors onboard the UAV.

In some embodiments, the method of providing communication coverage to a UAV may further comprise modifying the proposed flight path of the UAV. In some instances, the method may further comprise modifying the one or more locations for providing the one or more relays based on the modification to the proposed flight path of the UAV.

In some embodiments, the one or more relays may be stationary. Alternatively, the one or more relays may be mobile. In some instances, the one or more relays are other UAVs. In some instances, the one or more relays may be provided at locations having a quality of communications signals that exceeds a threshold value. The threshold value may vary for different locations. In some instances, the communications signal distribution along the proposed path may include one or more areas with poor telecommunication for the UAV. The one or more relays may be provided at locations where signal coverage of the one or more relays cover the one or more areas with poor telecommunication for the UAV.

In some embodiments, the communication signal distribution may be a cellular signal distribution. In some embodiments, the communications signal distribution may be within a three-dimensional airspace. For instance, the communications signal distribution may be at an altitude of the flight path of the UAV. In some embodiments, the one or more relays may authenticate an identification of the UAV.

In some embodiments, the UAV may comprise a third communication unit capable of directly communicating with the first communication unit of the relay. In some instances, the UAV may comprise a fourth communication unit capable of communicating with the telecommunication network. For instance, the one or more relays may be provided at locations where the one or more relays are capable of receiving signals from the UAV via the first communication unit and transmitting a signal via the second communication unit when the UAV is not capable of communicating over the telecommunication network. For instance, the one or more relays may be provided at locations where the one or more relays are capable of sending signals to the UAV via the first communication unit and receiving a signal via the second communication unit when the UAV is not capable of communicating over the telecommunication network. In some instances, the fourth communication unit may be a cellular communication unit. In some instances, the third communication unit may directly communicate with a remote controller comprising a fifth communication unit capable of directly communicating with the third communication unit of the UAV.

Aspects of the disclosure may further include a method of providing communication coverage to an unmanned aerial vehicle (UAV), the method comprising: collecting a location of the UAV while the UAV is in flight; determining a communication signal distribution in a proximity of the UAV; and determining one or more locations for providing one or more mobile relays based on the communication signal distribution, while the UAV is in flight to improve communication signal distribution along a flight path of the UAV.

Aspects of the disclosure may further include an apparatus for providing communication coverage to an unmanned aerial vehicle (UAV), the apparatus comprising: one or more processors configured to, individually or collectively: collect a location of the UAV while the UAV is in flight; determine a communications signal distribution in a proximity of the UAV; and generate signals to providing one or more mobile relays at one or more locations based on the communications signal distribution, while the UAV is in flight to improve communication signal distribution along a flight path of the UAV. In some embodiments, the apparatus may be an aerial vehicle such as another UAV.

In some embodiments, each of the one or more mobile relays may comprise (1) a first communication unit capable of directly communicating with the UAV and (2) a second communication unit capable of communicating over a telecommunications network.

In some embodiments, the first communication unit may be a wireless transceiver dedicated to communication between the UAV and the relay device. In some instances, the wireless transceiver may be a Wi-Fi transceiver. Optionally, the wireless transceiver may be a private transceiver. Optionally, the wireless transceiver may be a radio frequency transceiver. In some embodiments, the second communication unit is a cellular communication unit.

In some embodiments, the first communication unit may be capable of receiving a signal directly from the UAV. In some instances, the signal may include information about a multimedia file captured by the UAV. Optionally, the signal may include sensor data collected by one or more sensors onboard the UAV. In some embodiments, the first communication unit may be capable of transmitting a signal directly to the UAV. In some instances, the signal may include one or more commands that effect operation of the UAV. For instance, the one or more commands may affect flight of the UAV and/or operation of a payload of the UAV.

In some embodiments, the one or more mobile relays may be other UAVs. In some embodiments, the flight path of the UAV may be a proposed flight path or a random flight path.

In some embodiments, the one or more locations of the one or more mobile relays may change over time while the UAV is in flight. In some instances, one or more mobile relays may stay within a proximity of the UAV while the UAV is in flight. In some instances, the one or more locations of the one or more mobile relays may permit each of the mobile relays to have a quality of communications signal that exceeds a threshold value. In some instances, the one or more locations of the one or more mobile relays may permit each of the mobile relays to have a ground communication load beneath a threshold value.

In some embodiments, determining a communication signal distribution in a proximity of the UAV may include detecting a quality of telecommunication network signal in a proximity of the UAV. Alternatively, determining a communication signal distribution in a proximity of the UAV may include incorporating past experience data collective from other UAVs. Alternatively, determining a communication signal distribution in a proximity of the UAV may include incorporating past experience data collective from a communication service provider or receiving a preset setting of a communication service provider. Optionally, determining a communication signal distribution in a proximity of the UAV may include determining the communications signal distribution based on real-time notice from a communication service provider.

In some embodiments, the method of providing communication coverage to UAV may further comprise determining whether the UAV is capable of communication over the telecommunication network at a predetermined level of quality based on the communication signal distribution. In some instances, the method may further comprise permitting the UAV to communicate over the telecommunications network without using the one or more mobile relays when the UAV is capable of communications over the telecommunications network at the predetermined level of quality. In some instances, the method may further comprise permitting the UAV to communicate with the first communication unit of the one or more mobile relays when the UAV is not capable of communications over the telecommunications network at the predetermined level of quality.

In some embodiments, the method of providing communication coverage to UAV may further comprise determining whether the UAV is capable of direct communication with a remote controller at a predetermined level of quality. In some instances, the method may further comprise permitting the UAV to communicate directly with the remote controller without using the one or more mobile relays when the UAV is capable of direct communications with the remote controller at the predetermined level of quality. In some instances, the method may further comprise permitting the UAV to communicate with the first communication unit of the one or more mobile relays when the UAV is not capable of direct communications with the remote controller at the predetermined level of quality.

Aspects of the disclosure may further include a method of relaying communications from an unmanned aerial vehicle (UAV), the method comprising: receiving, at a first communication unit of a relay device, a wireless signal directly from the UAV; and transmitting, via a second communication unit of the relay device, a telecommunication signal over a telecommunication network, wherein the telecommunication signal conveys the wireless signal.

Aspects of the disclosure may further include a relay device of relaying communications from an unmanned aerial vehicle (UAV), the relay device comprising: a first communication unit configured to receive a wireless signal directly from the UAV, the wireless signal conveying a digital file information; and a second communication unit connected to the first communication unit and configured to transmit a telecommunications signal over a public network, wherein the telecommunications signal conveys the digital file information.

In some embodiments, the telecommunication network may be a cellular network. In some embodiments, the wireless signal may convey a multimedia file. The multimedia file may be a video file or an image file. Alternatively, the wireless signal may convey sensor data collected by one or more sensors onboard the UAV.

In some embodiments, the relay device may be a stationary relay device. Alternatively, the relay device may be a mobile relay device such as another UAV.

In some embodiments, the first communication unit may be a wireless transceiver dedicated to communication between the UAV and the relay device. In some instances, the wireless transceiver may be a Wi-Fi transceiver, a radio frequency transceiver or a private wireless transceiver. In some embodiments, the second communication unit may be a cellular communication unit.

In some embodiments, a remote controller may be configured to receive the telecommunication signal from the telecommunication network. In some instances, the remote controller may be configured to accept a user input that generates an operation command. For instance, the remote controller may be a server, a personal computer, or a mobile terminal. The operation command may affect flight of the UAV or operation of a payload of the UAV.

Aspects of the disclosure may further include a method of relaying communications to an unmanned aerial vehicle (UAV), the method comprising: receiving, at a second communication unit of a relay device, a telecommunication signal from over a telecommunication network, wherein the telecommunications signal conveys a UAV operation command; and transmitting, via a first communication unit of the relay device, a wireless signal directly to the UAV, the wireless signal conveying the UAV operation command.

Aspects of the disclosure may further include a relay device of relaying communications to an unmanned aerial vehicle (UAV), the relay device comprising: a second communication configured to receive a telecommunication signal from over a telecommunication network, wherein the telecommunication signal conveys a UAV operation command; and a first communication unit configured to transmit a wireless signal directly to the UAV, the wireless signal conveying the UAV operation command.

In some embodiments, the telecommunication network may be a cellular network. In some embodiments, the first communication unit may be a wireless transceiver dedicated to communication between the UAV and the relay device. For instance, the wireless transceiver is a Wi-Fi transceiver, a radio frequency transceiver or a private wireless transceiver. In some embodiments, the second communication unit is a cellular communication unit.

In some embodiments, the relay device may be a stationary relay device. Alternatively, the relay device may be a mobile relay device. For instance, the mobile relay device may be another unmanned aerial vehicle.

In some embodiments, the UAV operation command may affect flight of the UAV. Alternatively, the UAV operation command may affect operation of a payload carried by the UAV. Optionally, the UAV operation command may affect positioning of a payload carried by the UAV, relative to the UAV.

In some embodiments, a remote controller may be configured to receive a user input that generates the UAV operation command. In some instances, the remote controller may be a server, a personal computer, or a mobile terminal.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

The systems and methods described herein may provide relays at positions where an unmanned aerial vehicle (UAV) may not directly communicate with a communication network such as a cellular communication network, to guarantee a communication between the UAV and the communication network along an entire flight path of the UAV. A method of providing communication coverage to a UAV may comprise collecting information about a proposed flight path of a UAV, and determining one or more locations for providing one or more relays based on a public communications signal distribution along the flight path. In some embodiments, the relay may comprise a first communication unit, such as a Wi-Fi unit, capable of directly communicating with the UAV and a second communication unit, such as a cellular unit, capable of communicating over a communication network. At positions where a quality of public communication signal is satisfactory, the UAV may directly communicate with the communication network. At positions having weak or no public communication signal, the UAV may communicate with the relay over Wi-Fi, and then the relay may send the communication from UAV to the communication network by cellular. This may permit the UAV to have continuous and seamless communication with the communication network along the entire flight path. In some embodiments, the relays may be stationary relays. Alternatively, the relays may be movable relays, such as other UAVs having a Wi-Fi unit and a cellular unit onboard.

The systems and methods described herein may also receive data from a UAV and transmit the received data to a public communication network, or receive data from a public communication network and transmit the received date to a UAV. The communication between the UAV and relay device may be carried over a first communication link such as a Wi-Fi link, and the communication between the relay device and the public communication network may be carried over a second communication link such as a cellular link. The first and second communication may be of different types of communication. A wireless signal data may be received from UAV and transmitted over the communication network, and a communication signal may be received from a remote controller over the communication network and transmitted to the UAV in a rapid and stable way during the entire flight path of UAV, regardless of a distribution of the communication signal, such as a quality of cellular communication signal over the flight path.

Figure 1:
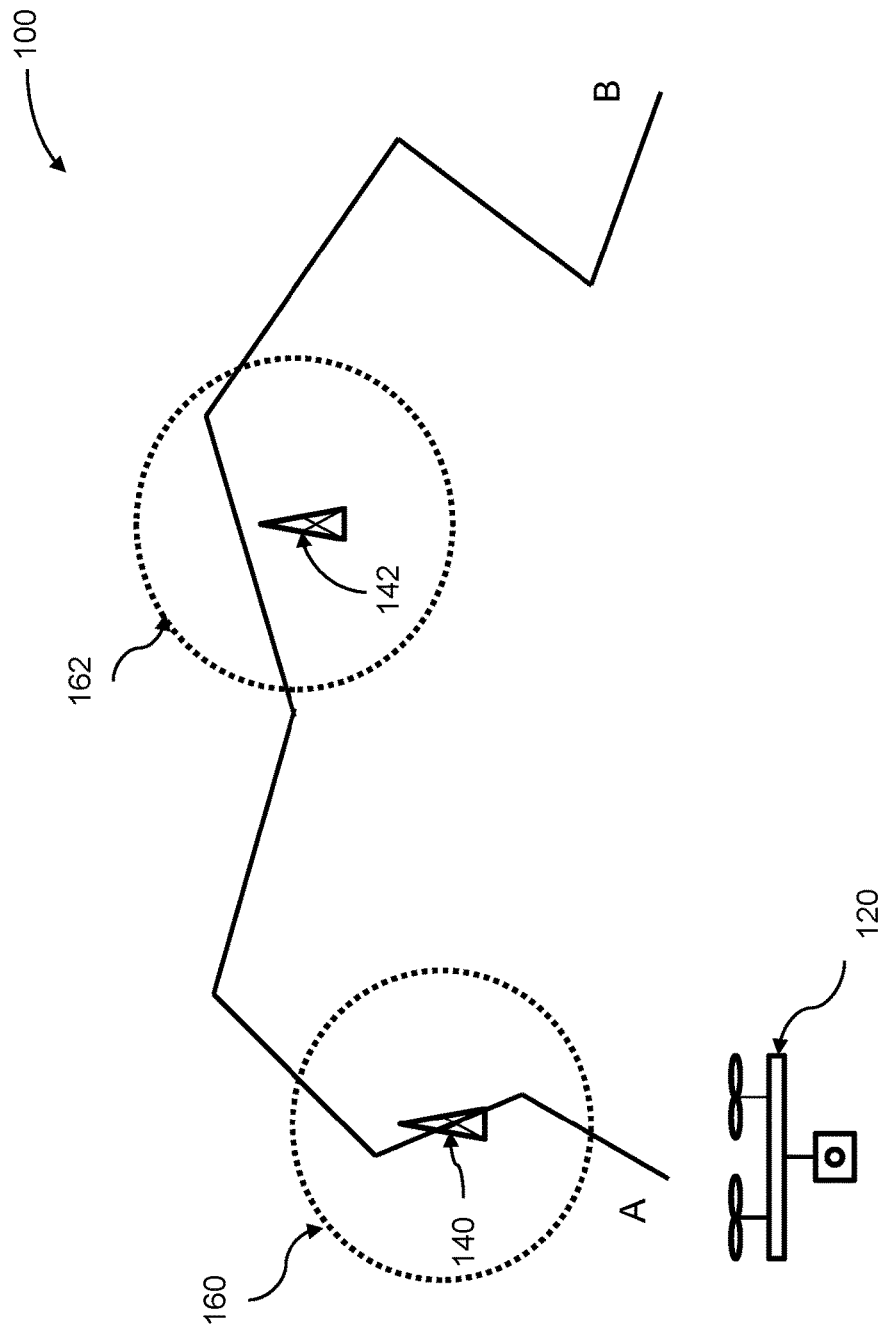
FIG. 1 shows an illustration of relays positioned along a flight path of a UAV, in accordance with some embodiments of the disclosure.

FIG. 1 shows an illustration of relays positioned along a flight path of a UAV, in accordance with some embodiments of the disclosure. In some embodiments, the UAV 120 may have a proposed or fixed flight path, such as a fixed flight path starting from point A to point B as shown in FIG. 1. The proposed flight path of UAV may be planned before the UAV taking off. In some instances, the proposed flight path of UAV may be planned for completing a particular mission, such as inspecting a power line, package delivering, photograph, aerial surveillance or patrolling a national boundary. For instance, the proposed flight path of UAV may be pre-registered with an administrative authority or a commercial entity. The user may upload the proposed flight path of UAV to an online administrative system, including information about the proposed path of the flight, the proposed time window of the flight, the propose task of the flight, the proposed altitude of the flight, an identification of the UAV, the model of the UAV, and/or an identification of the user. The user may cancel the proposed flight before the UAV taking off or modify the details of the proposed flight before or during the UAV's flight. In some instances, the flight path of UAV may be planned by considering a communication signal coverage, a remote controller signal coverage, an aerial traffic control, a usage of free/commercial aerial path, a congestion of aerial path, and/or a terrain condition along the aerial path. Alternatively, the flight path of UAV may be a random flight path. For instance, the UAV may be manually controlled by a user through a remote controller in a real-time manner. In some instances, the random flight path may not be pre-registered but may follow a set of administrative rules.

In some embodiments, the UAV may autonomously or semi-autonomously fly along a proposed path. For instance, the UAV may follow a proposed flight path by using a real-time GPS (Global Positioning System) signal information during the flight. Alternatively, the UAV may be manually controlled to follow a proposed flight path or fly randomly. In some instances, the flight path of the UAV may be in a form of a straight line or a curve connecting the start point and an ending point. Optionally, the flight path of the UAV may be in a form of random shape, such as an irregular shape composed of a plurality of straight lines and curves. For instance, the flight path of UAV may not be a straight line connecting the start pint and ending point, but having a plurality of turning points along the flight path.

In some embodiments, the UAV may communicate with user terminals along the entire flight path. The user terminals may include a remote controller, a control center, a display device, a ground station, a communication base station, a communication relay device, and/or a transceiver. In some embodiments, the user terminal may connect to a communication network such as a cellular network. Alternatively, the user terminal may directly communicate with the UAV. In some instances, the UAV may communicate with the user terminals to transmit data collected by sensors onboard the UAV to a user terminal. For instance, the UAV may transmit images or videos captured by an onboard camera to a monitoring device on the ground or a storage device on the ground. For another instance, the UAV may transmit a GPS (Global Positioning System) information measured by an onboard GPS module to a monitoring device on the ground, such that the user may monitor and track a flight of the UAV. Optionally, the UAV may receive data transmitted from a user terminal. For instance, operation commands may be transmitted from remote controller to the UAV to affect an operation of the UAV, such as flight of the UAV or an operation of a payload of the UAV. In some instances, the flight of UAV may include but not limited to a speed of UAV, a translational and/or angular acceleration of UAV, an attitude of UAV, a taking off of UAV and/or a landing of UAV. In some instances, the operation of a payload may include but not limited to changing a position of the payload relative to UAV, a zooming in and/or zooming out of a camera, and/or a power on/off of a sensor.

In some embodiments, the UAV may communicate with a communication network along the entire flight path. The communication network may be a cellular network, a WLAN (Wireless Local Area Network) or Internet. In some instances, the UAV may communicate with a communication network to transmit data collected by sensors onboard the UAV to a user terminal, e.g., UAV location, UAV attitude, power level of battery stack, if the user terminal is also connected to the communication network. For instance, the UAV may transmit images or videos captured by an onboard camera to a remote server or device on the communication network. Optionally, the UAV may receive data transmitted from a remote server or device on the communication network. For instance, operation commands may be transmitted from remote device to the UAV to affect a flight of the UAV or an operation of a payload of the UAV.

In some embodiments, the communication between a UAV and a user terminal may be carried by any suitable means of communication, such as wired communication or wireless communication, a direct communication or indirect communication. For example, UAV may utilize one or more of local area networks (LAN), wide area networks (WAN), infrared, radio, Wi-Fi, point-to-point (P2P) networks, communication networks, cloud communication, and the like to communicate with the user terminal. Optionally, relay stations, such as towers, satellites, or mobile stations, may be used. Wireless communications can be proximity dependent or proximity independent. In some embodiments, line-of-sight may or may not be required for communications.

In some embodiments, the communication between a UAV and a user terminal may be carried on over a dedicated link. In some instances, the dedicated link may be a wireless link such as a Wi-Fi link, a RF (radio frequency) link, a Bluetooth link, a ZigBee link, a private wireless link, a P2P network, or a WALN (Wireless Local Area Network) link. For instance, a private wireless link may be a link developed and used internal to an entity, a corporate or an organization. Optionally, the dedicated link may be a wired link such as a twisted copper wire link or an optical fiber link. For instance, the UAV may transmit data to or receive data from a ground station via a Wi-Fi link which is established. For another instance, the UAV may receive an operation command from a remote controller via a ZigBee link which is established between a ZigBee module on the UAV and another ZigBee module on the remote controller.

Alternatively, if both the UAV and user terminal are equipped with a cellular module, the communication between the UAV and the user terminal may be carried over a cellular link via a cellular network. For instance, the UAV may transmit the captured image data or collected sensor data to a ground monitoring device via an onboard cellular communication module. In this case, the captured image data or collected sensor data may be firstly transmitted to a base station of a cell in which the UAV locates, then routed to a base station of a cell in which the ground monitoring device locates, and sent to the ground monitoring device which is also equipped with a cellular communication module.

In some embodiments, a communication signal such as cellular signal may be available along the entire flight path of the UAV 120. For instance, along the entire flight path, a signal quality of cellular communication network may be above a predetermined threshold value and the UAV can directly communicate with the cellular communication network via an onboard cellular communication unit. In this case, the UAV may directly communication with the communication network such as a cellular communication network along the entire flight path and send/receive data to/from a user terminal which is connected to the communication network. For instance, the UAV may transmit data collected by sensors onboard the UAV to a remote server or device through the cellular communication network, and receive operation command from a remote server or device through the cellular communication network, along the entire flight path. In some embodiments, the threshold may be a fixed value along entire flight path of UAV. Alternatively, the threshold may be manually or automatically changed according to a specific communication condition such as a weather effect, a terrain condition, an altitude of the UAV, a congestion of cellular communication.

Alternatively, a communication signal such as cellular signal may not always be available along the entire flight path of the UAV 120. For instance, at one or more locations along the flight path, a signal quality of cellular communication network may fall beneath a predetermined threshold value and the UAV may not directly communicate with the cellular communication network. In this case, in order to maintain a continuous communication with the communication network, one or more auxiliary communication devices may be disposed to provide a communication between the UAV and the communication network at locations where the UAV cannot directly communicate with the communication network. In some embodiments, an auxiliary communication device may be a device having a capacity of receiving data from the UAV and transmitting data to the UAV via a communication link, and a capacity of communicating with a communication network. At locations where the UAV cannot directly communicate with the communication network, a bi-directional communication can be established between the UAV and the communication network via the one or more auxiliary communication device.

Alternatively, a communication signal such as cellular signal may not be available along the entire flight path of the UAV 120. For instance, a signal quality of cellular communication network may fall beneath a predetermined threshold value along the entire flight path of UAV. In this case, one or more auxiliary communication devices may be disposed along the flight path of UAV to provide a communication between the UAV and the communication network. In some instance, the auxiliary communication devices may be connected with each other through a wired network. Along the entire flight path, a bi-directional communication can be established between the UAV and the communication network via the one or more auxiliary communication device.

In some embodiments, the auxiliary communication device may be a ground communication device such as a relay, a transceiver, or a base station of cellular communication systems. A relay may be a device which can provide a communication link between the UAV and the relay itself, and can directly communicate with the communication network. In some instances, the ground communication device may be stationary. For instance, the ground communication device may be installed at a fixed position. Optionally, the ground communication device may be movable. For instances, the ground communication device may be carried on a movable object such as a vehicle. Alternatively, the auxiliary communication device may be an aerial communication device. In some instances, the aerial communication device may be an aerial vehicle, such as an unmanned aerial vehicle (UAV), carrying a communication unit capable of directly communicating with the UAV. Optionally, the aerial communication device may be a communication device carried by an air balloon. In some instances, the aerial communication device may be relatively stationary in the air. For instance, the aerial communication device may stay or hover at a certain position in the air. Optionally, the aerial communication device may be movable in the air. For instance, the aerial communication device may fly to follow the UAV along the entire or partial flight path of the UAV.

As illustrated in FIG. 1, two auxiliary communication devices such as relays 140, 142 may be disposed to provide the UAV a communication to the communication network at locations where the UAV cannot directly communicate with the communication network. The relays 140 and 142 may each have a coverage 160 and 162, respectively. In some embodiments, the relays 140, 142 may each be disposed at locations have a quality of public communication signal that exceeds a threshold value. For instance, the relays may each be disposed at locations where the cellular communication signal is strong, so that the relays may communicate with the cellular communication system. The communication signal of a relay may cover all or a part of a region where the communication signal is not available to the UAV, and relay a communication from and UAV to the communication network and a communication from the communication network to the UAV. For instance, the UAV, which is flying at a region having no direct access to the cellular communication system, may communicate with the relay via a dedicated communication link such as a Wi-Fi link, and the relay may send the communication from UAV to the cellular communication system. This may permit the UAV a communication with the cellular communication network via the relay at locations where the UAV cannot directly communicate with the cellular communication network.

Figure 2:
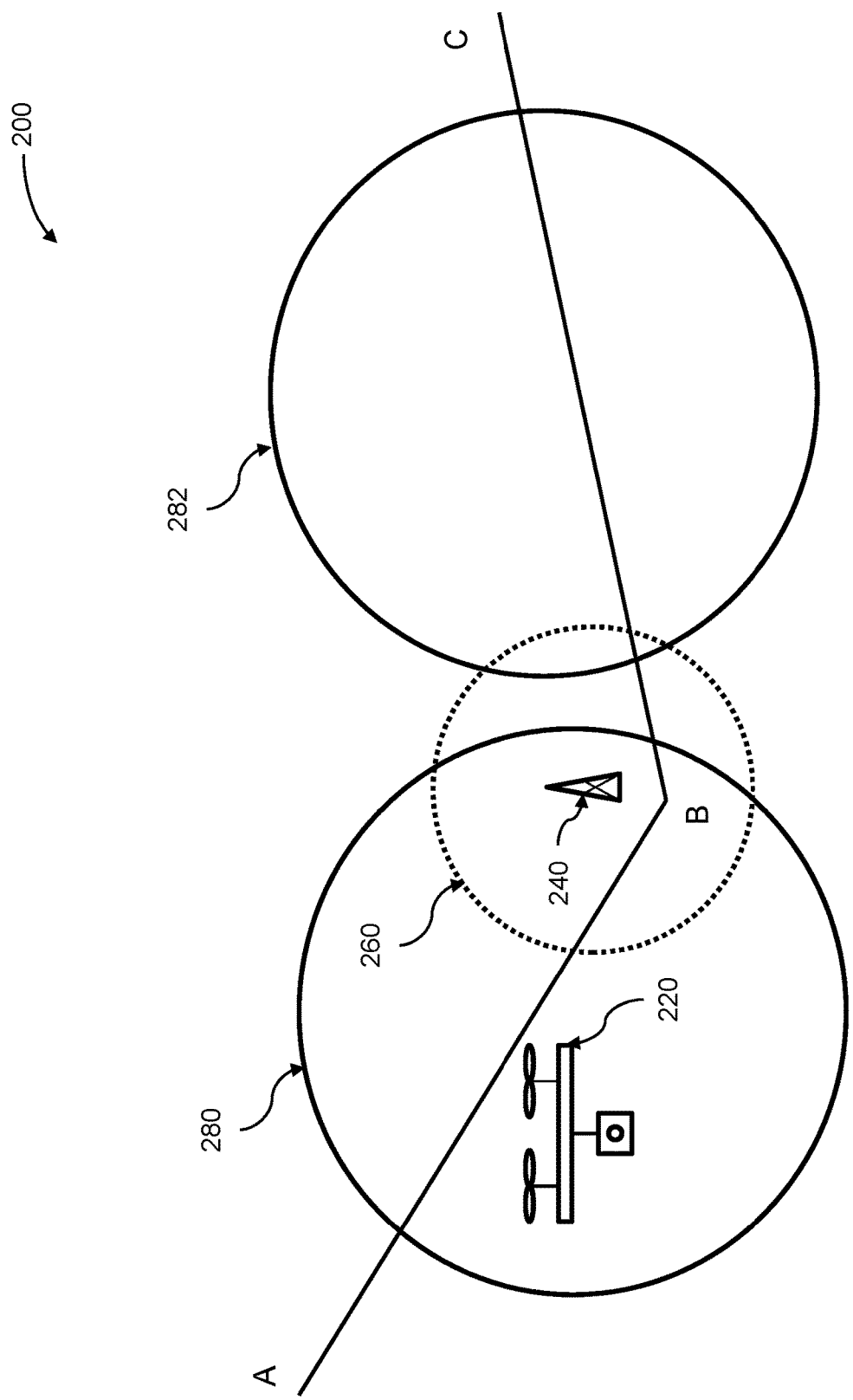
FIG. 2 shows an illustration of providing communication coverage to a UAV by disposing one relay, in accordance with some embodiments of the disclosure.

FIG. 2 shows an illustration of providing communication coverage to a UAV by disposing one relay, in accordance with some embodiments of the disclosure. For instances, the UAV 220 may fly along a flight path from point A to point C via point B. The flight path may be covered by public communication signal at regions within a first public communication coverage 280 and a second public communication coverage 282, except for a region between the first and second public communication coverages. In some embodiments, the public communication signal may be a telecommunication signal such as a cellular signal.

In some embodiments, the relay 240 may be disposed to provide communication at a region between the first public communication coverage 280 and the second public communication coverage 282 where no satisfactory communication signal is available to the UAV. The relay 240 may have a signal coverage 260, which may cover the region where the quality of the public communication signal falls beneath a threshold value between the first and second public communication coverages. In some embodiments, the relay may be disposed at a location having a quality of communication signal that exceeds a threshold value. For instance, the relay 240 itself may be disposed within the first public communication coverage 280 where the cellular signal is strong, so that the relay may communicate with the cellular communication network. Here, the quality of the public communication signal may be measure within a three-dimensional airspace. In some instances, the quality of the public communication signal may be measured or estimated at an altitude the UAV is flying along the flight path.

In some embodiments, the UAV may directly communicate with the communication network such as a cellular communication network when the UAV is flying within the first and second public communication coverages where the quality of public communication signal exceeds a threshold value. When the UAV is flying within a region out of any public communication coverage where the quality of public communication signal falls beneath the threshold value, the UAV may directly communicate with a relay, and the relay may relay the UAV communication to the communication network. By disposing a relay which has a signal coverage covering a region where a quality of the public communication signal falls beneath a threshold value, a continuous and seamless public communication may be maintained along the entire flight path of the UAV, even at locations the UAV cannot directly communicate with the public communication system.

Alternatively, the UAV may not carry onboard a communication unit which can communicate with the communication network such as a cellular communication network. In this case, the UAV may communicate with one or more relays only, which are provided along the flight path of the UAV, along the entire flight path.

Figure 3:
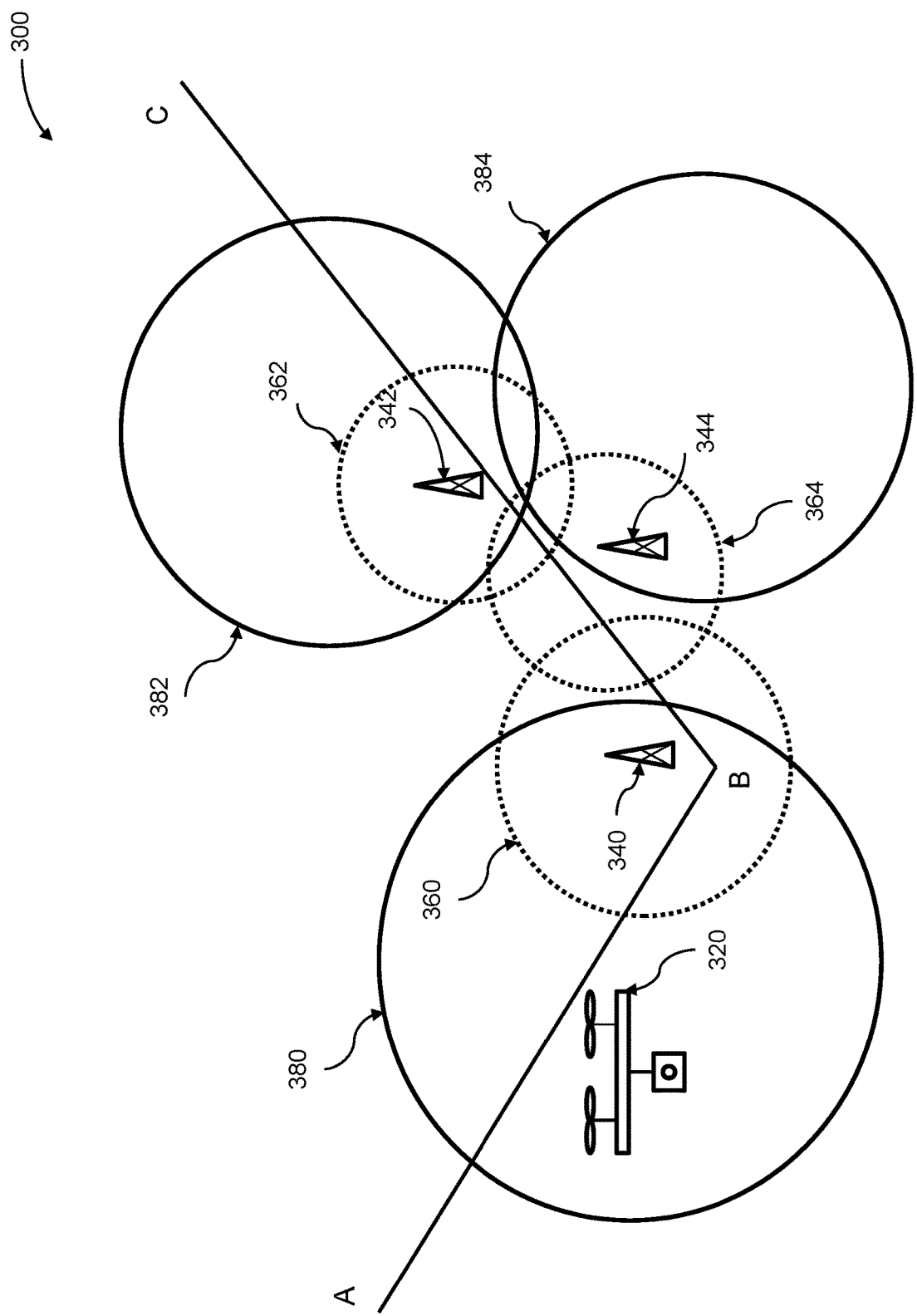
FIG. 3 shows an illustration of providing communication coverage to a UAV by disposing more than one relays, in accordance with some embodiments of the disclosure.

FIG. 3 shows an illustration of providing communication coverage to a UAV by disposing more than one relays, in accordance with some embodiments of the disclosure. For instances, the UAV 320 may fly along a flight path from point A to point C via point B. The flight path may be covered by public communication signal at regions within a first public communication coverage 380 and a second public communication coverage 382, except for a region between the first and second public communication coverages.

In some embodiments, one or more than one relays may be disposed to cover a region where the quality of communication signal falls beneath a threshold value. The number of relays to be disposed may be determined at least based on a coverage of a relay, a disposing location of a relay within a public communication coverage, and a size of the region where the quality of public communication signal falls beneath a threshold value. In some instances, two relays may be disposed to provide communication to UAV at locations the quality of public communication signal falls beneath a threshold value. The two relays themselves may be respectively disposed within two public communication coverages, and may communicate with each other through the communication network. For instance, a plurality of cellular base stations, which provide a plurality of cellular communication coverages, may communicate with each via a backbone cellular network. Optionally, three or more relays may be disposed to provide communication to UAV at locations the quality of public communication signal falls beneath a threshold value. The three or more relays themselves may respectively locate within three or more public communication coverages, and may communicate with each other through the communication network. Therefore, at locations the UAV cannot directly communicate with the public communication system, the UAV may communicate with the public communication system via the relays which communicate with each other.

For instance, as shown in FIG. 3, the UAV 320 may not directly communicate with the cellular communication network at a region out of a first public communication coverage 380, a second public communication coverage 382 and a third public communication coverage 384 where a quality of the cellular communication signal falls beneath a threshold value. A first relay 340 having a first signal coverage 360 and a second relay 342 having a second signal coverage 362 may be disposed to provide communication to the UAV in the region where the quality of the communication signal falls beneath the threshold value. The first relay 340 may be disposed within the first public communication coverage 380 and the second relay 342 may be disposed within the second public communication coverage 382 where the quality of the cellular communication signal is above a threshold value.

In some instances, if the region between the first and second public communication coverages where the quality of the cellular communication signal falls beneath the threshold value may not be fully cover by the first and second signal coverages of the first and second relays, a third relay 344 having a third signal coverage 364 may be disposed to provide communication to the UAV at a region which is not covered by the first and second signal coverages. The third relay may be disposed within a third public communication coverage 384 where the quality of the communication signal is above a threshold value. More relays may be disposed if the region at which the UAV cannot directly communicate with the communication network is not fully covered by the first, second and third signal coverages of the first, second and third relays. Here, the quality of the communication signal may be measure within a three-dimensional airspace. In some instances, the quality of the public communication signal may be measured or estimated at an altitude the UAV is flying along the flight path.

In some embodiments, the plurality of relays may communicate with each through the communication network. For instance, a plurality of cellular base stations, which provide a plurality of cellular communication coverages, may communicate with each other via a backbone communication network. This may permit the plurality of relays communicate with each other through the cellular communication network even if the plurality of cellular communication coverages are separate from each other, as shown in FIG. 3. Alternatively, the plurality of relays may be connected and communicate with each through a wired network. The inter-communication among the plurality of relays may guarantee a continuous and seamless communication between the UAV and the communication network such as a cellular communication network.

In some embodiments, a communication between the UAV and the plurality of the relays may switch among the plurality of the relays. A switching or handover between adjacent relays may be implemented by various schemes. In some embodiments, the handover between adjacent relays may be a hard handover. For instance, a hard handover may be a handover in which the channel in the source relay coverage is released and only then the channel in the target relay coverage is engaged. Alternatively, the between adjacent relays may be a soft handover. For instance, a soft handover may be a handover in which the channel in the source relay coverage is retained and used for a while in parallel with the channel in the target relay coverage.

In some embodiments, the telecommunication operator may coordinate with the UAV to enhance an efficiency of UAV's data uploading/downloading and achieve a balance in traffic load of telecommunication network. For instance, the cellular cell within which the UAV locates may bear a large communication traffic and thus may not support a data uploading/downloading to/from the UAV. In this case, the UAV may communicate with a relay, which is provided within a signal coverage of an adjacent cellular cell bearing less communication traffic, and communicate with the adjacent cellular cell through the relay. In some instances, the UAV may switch to the relay, which is provided within a signal coverage of an adjacent cellular cell, based on commands or real-time notices from the communication operator. Optionally, the UAV may switch to the relay, which is provided within a signal coverage of an adjacent cellular cell, based on communication condition measured by the UAV. For instance, the UAV may switch to the relay, which is provided within a signal coverage of an adjacent cellular cell, if the UAV fails to receive a requested bandwidth from the cellular cell within which the UAV locates.

In some embodiments, the UAV may directly communicate with the communication network such as a cellular communication network when the UAV is flying within regions where the quality of public communication signal exceeds a threshold value. When the UAV is flying within a region out of any public communication, the UAV may directly communicate with one of the plurality of relays, and the relay may send the UAV communication to the communication network. By disposing a plurality of relays, which have signal coverages collectively covering a region where a quality of the public communication signal falls beneath a threshold value, a continuous and seamless public communication may be maintained between UAV and the public communication network, even at locations the UAV cannot directly communicate with the public communication system.

Figure 4:
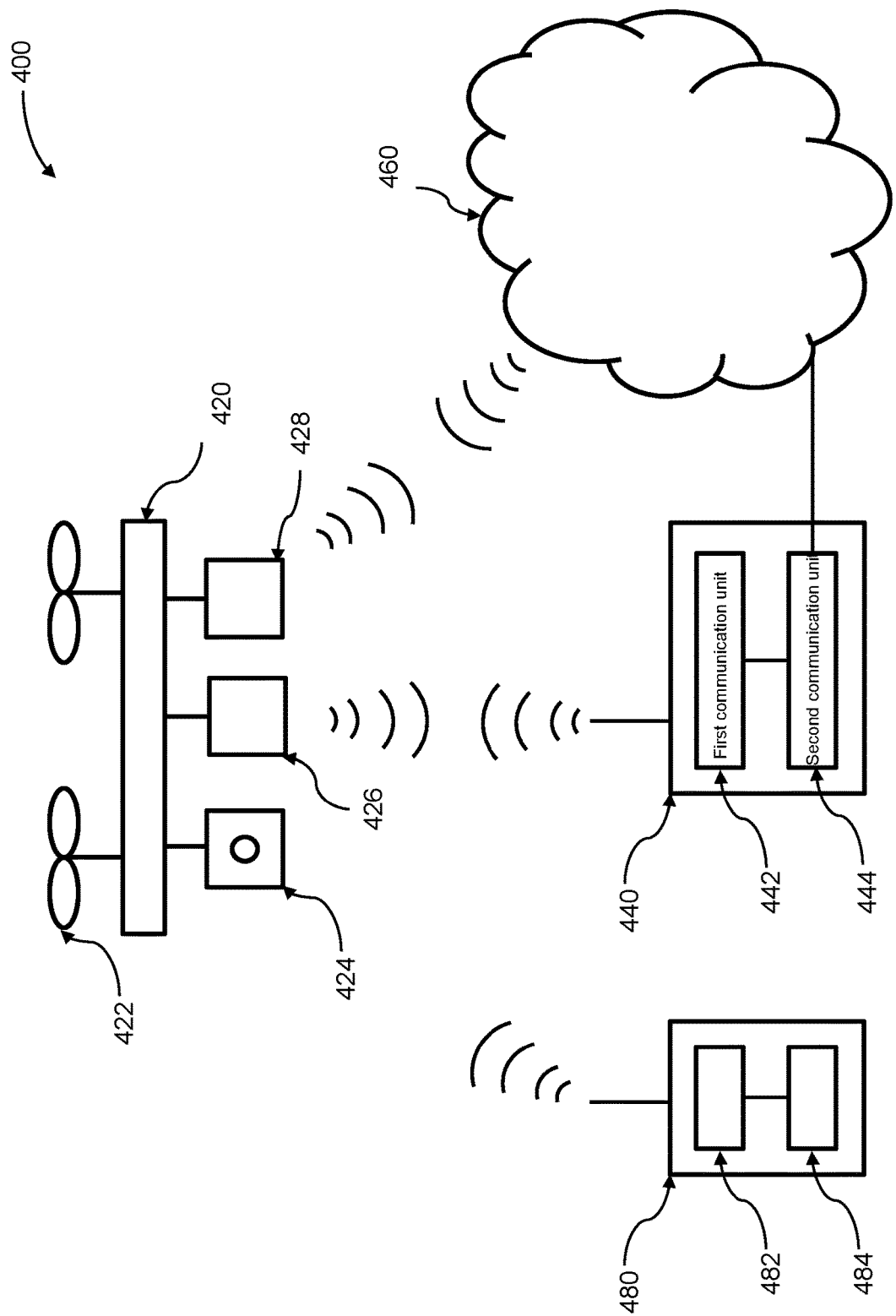
FIG. 4 shows an illustration of a ground relay disposed for an unmanned aerial vehicle (UAV), in accordance with some embodiments of the disclosure.

FIG. 4 shows an illustration of a ground relay disposed for an unmanned aerial vehicle (UAV), in accordance with some embodiments of the disclosure. The UAV 420 may have one or more propulsion units 422 that may permit the UAV to move about in the air. The UAV may be a rotorcraft. In some instances, the UAV may be a multi-rotor craft that may include a plurality of rotors. The plurality or rotors may be capable of rotating to generate lift for the UAV, enabling the UAV to move about freely through the air (e.g., with up to three degrees of freedom in translation and/or up to three degrees of freedom in rotation). In some embodiments, the UAV may carry onboard an image sensor 424 such as a camera, a dedicated communication unit 426 and a public communication unit 428. The dedicated communication unit may directly communicate with one or more relays 440 via a dedicated link such as a Wi-Fi link. The public communication unit 428 may directly communicate with a communication network 460 at locations where a quality of public communication signal exceeds a threshold value. In some embodiment, the public communication unit 428 may be a cellular communication unit.

In some embodiments, the relay 440 itself may be provided at a location having a quality of public communication signal that exceeds a threshold value, so that the relay may communicate with the communication network 460. In some instances, a relay may be a device which can communicate with a public communication network and can also provide a communication signal coverage. For instance, a relay may be communicate with a communication network such as a cellular communication network, and meanwhile, the relay may provide a signal coverage so that other devices can communicate with the cellular communication network by communicating with the relay. In some embodiments, the relay 440 may comprise a first communication unit 442 capable of directly communicating with the dedicated communication unit of the UAV, and a second communication unit 444 connected to the first communication unit and capable of communicating over communication network 460 or a wired communication network.

In some embodiments, the first communication unit 442 of the relay 440 may be a wireless transceiver dedicated to a communication between the UAV and the relay device. For instance, the first communication unit 442 of the relay 440 may directly communicate with the dedicated communication unit 426 of the UAV. In some instances, the wireless transceiver may be a Wi-Fi transceiver. Optionally, the wireless transceiver may be a RF (radio frequency) transceiver. Optionally, the wireless transceiver may be a private wireless transceiver. Accordingly, the dedicated communication unit 426 of the UAV 420 may be a Wi-Fi transceiver. Optionally, the dedicated communication unit may be a RF (radio frequency) transceiver. Optionally, the dedicated communication unit may be a private wireless transceiver.

In some embodiments, the first communication unit 442 of the relay 440 may be capable of receiving a signal directly from the UAV. The signal received from the UAV may be transmitted to communication network via the second communication unit 444 connected to the first communication unit 442. In some instances, the signal received from the UAV may include information about a multimedia file captured by the UAV. For instance, the multimedia file may be images or videos captured by a camera onboard the UAV. Optionally, the signal received from the UAV may include sensor data collected by one or more sensors onboard the UAV. In some embodiments, the first communication unit of the relay may be capable of transmitting a signal directly to the UAV. In some instances, the signal transmitted to the UAV may include one or more commands that effect an operation of the UAV. For instance, the one or more commands may affect a flight of the UAV or an operation of a user terminal controller which is configured to accept a user input. The user terminal such as a remote controller may be connected to the communication network.

In some embodiments, the second communication unit 444 of the relay 440 may a cellular communication unit. The data received by the second communication unit may be transmitted to the UAV via the first communication unit 442 which is connected to the second communication unit. Alternatively, the second communication unit of the relay may a wired communication unit which can communicate with other relays over a wired network. In some instances, the second communication unit may be configured to communicate with a remote controller over the communications network. Optionally, the second communication unit may be configured to receive one or more commands that affect operation of the UAV. For instance, a user may input UAV operation commands into a remote controller such as a mobile phone or a personal computer which is connected to the communication network. The UAV operation commands may be transmitted from the remote controller to the second communication unit of the relay through the communication network, and then to the UAV via the dedicated communication link established between the first communication unit of the relay and the dedicated communication unit of the UAV, such that the UAV may operate according to user's UAV operation commands. In some instances, the second communication unit may be configured to transmit information about a multimedia file captured by the UAV. Optionally, the second communication unit may be configured to transmit sensor data collected by one or more sensors onboard the UAV. For instance, images or videos captured by a camera onboard the UAV and various sensor date collected by sensors onboard the UAV may be transmitted from the dedicated communication unit of the UAV to the first communication unit of the relay, and then to the communication network through the second communication unit of the relay, such that the images and video may be shared on a social network or viewed by the user.

As discussed herein above, by providing one or more relays along the flight path of UAV based on a communication signal distribution, the UAV may communicate with the communication network along the entire flight path. In some instances, at locations where a quality of public communication exceeds a threshold value, the UAV may directly communicate with the communication network through the onboard public communication unit. Optionally, at locations where a quality of public communication falls beneath the threshold value, the UAV may communicate with the communication network through the one or more relays which are provided based on a communication signal distribution along the flight path.

Alternatively, the UAV may not carry onboard a public communication unit which can directly communicate with a communication network. In this case, the UAV may only communicate with one or more relays along the entire flight path. For instance, one or more relays may be disposed along the flight path of UAV to provide a continuous signal coverage to the UAV, and the UAV may communicate with the communication network via the one or more relays only along the entire flight path. The one or more relays may be deployed along the flight path of UAV prior to the flight of UAV if no telecommunication signal is available to UAV along the flight path of the UAV or if a reliable private communication are desired. In some instances, the relays may communicate with each other by a wired network. For instance, the second communication unit of the relay may a wired communication unit.

In some embodiments, an identification of the UAV may be authenticated through the entire flight path. In some instances, when the UAV flies at location where the UAV can directly communicate with the communication network, the identification of the UAV may be authenticated by checking and confirming the identification with an authentication center on the communication network. For instance, if the authentication fails, the UAV may be forced to land. Optionally, when the UAV flies at location where the UAV cannot directly communicate with the communication network, the identification of the UAV may be performed by one or more relays which may communicate with the communication network. For instance, the one or more relays may request an identification of the UAV which communicates with the one or more relays, and send the identification of the UAV to an authentication center on the communication network.

In some embodiments, the UAV 420 comprising the dedicated communication unit 426 and the public communication unit 428 may provide a communication coverage to a user terminal 480. In some instances, the user terminal may be a remote controller, a personal computer, or a mobile device.

In some embodiments, the user terminal may comprise a fifth communication unit 482 which may directly communicate with the dedicated communication unit 426 via a dedicated link such as a Wi-Fi link. The user terminal having no public communication capacity may communicate with the communication network via the UAV. For instances, at locations where the UAV can directly communicate with the cellular communication network, the user terminal may directly communicate with the UAV by a Wi-Fi link established between the fifth communication unit of the user terminal and the dedicated communication unit of the UAV, then the UAV may send the communication from the user terminal to the cellular communication network by a cellular link established between the public communication unit of UAV and the cellular communication network. Optionally, the user terminal may communicate with the communication network via both the UAV and the relay 440. For instances, at locations where the UAV cannot directly communicate with the cellular communication system, the user terminal may directly communicate with the UAV by a Wi-Fi link established between the fifth communication unit of the user terminal and the dedicated communication unit of the UAV, then the UAV may send the communication from the user terminal to the relay by a Wi-Fi link established between the dedicated communication unit of the UAV and the first communication unit of the relay, and then the relay may send the communication from the UAV to the cellular communication network by a cellular link established between the second communication unit of the relay and the cellular communication network. Therefore, since the UAV may directly communicate with the communication network or communicate with the communication network via one or more relays during the entire flight path, a user terminal which can directly communicate with the UAV may also communicate with the communication network via the UAV. For instance, the user terminal may get access to Internet via the UAV even if the user terminal does not have a public communication capacity.

Alternatively, the fifth communication unit 482 of the user terminal 480 may directly communicate with the first communication unit 442 of the relay 440. In some instances, the user terminal may communicate with the relay via a dedicated link established between the fifth communication unit of the user terminal and the first communication unit of the relay, then the second communication unit 444 of the relay may send the communication from the user terminal to the communication network, and vice versa.

In some embodiments, in addition to the fifth communication unit 482 which may directly communicate with the dedicated communication unit 426 of the UAV via a dedicated link such as a Wi-Fi link, the user terminal may comprise a six communication unit 484 which may communicate with the public communication system network. For instance, the six communication unit may be a cellular communication unit which may communicate with the cellular communication network. In some instances, the user terminal such as a mobile phone may receive a user's input and transmit the user's input to the UAV via the communication network, at locations where the UAV can directly communicate with the communication network. In some embodiments, the user's input may be flight command that may affect an operation of the UAV or an operation of payloads of the UAV. For instances, a user may input a flight command to a user terminal such as a mobile phone, the flight command may be transmitted to the cellular network via a cellular link between the mobile phone and the cellular network and then to the UAV via a cellular link between the cellular network and the UAV. Optionally, the user terminal such as a mobile phone may receive a user's input and transmit the user's input to the UAV via the relay, at locations where the UAV cannot directly communicate with the communication network. For instances, a user may input a flight command to a user terminal such as a mobile phone, the flight command may be transmitted to the cellular network via a cellular link between the mobile phone and the cellular network, then to the relay via the cellular link between the cellular network and the relay, and then to the UAV via a Wi-Fi link between the relay and the UAV.

Figure 5:
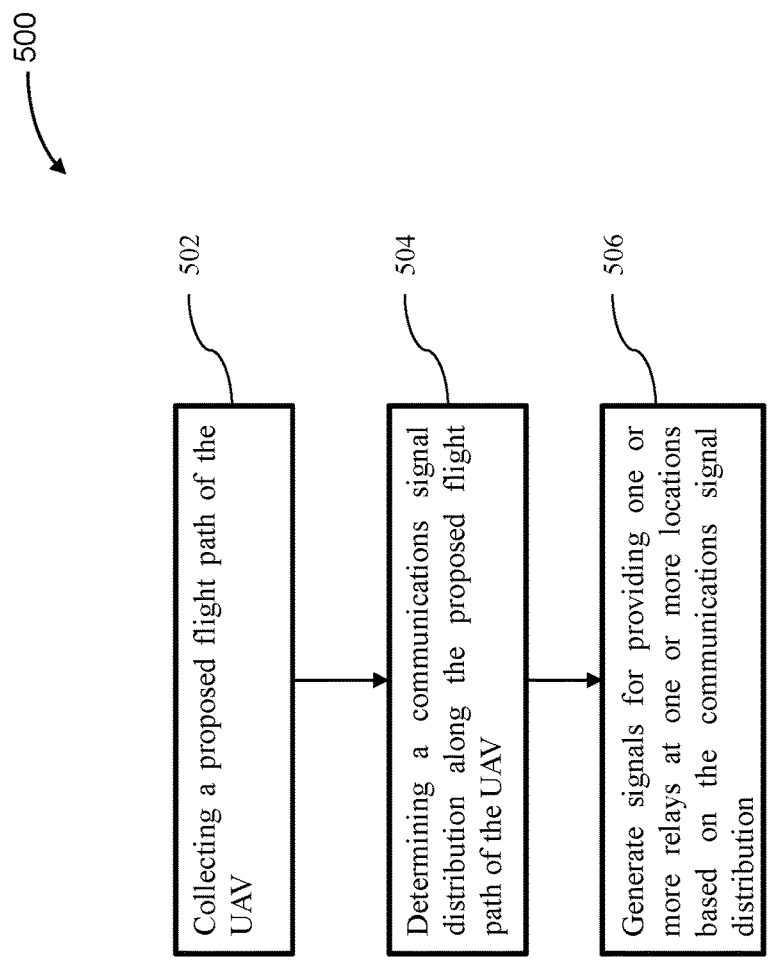
FIG. 5 is a flow chart illustrating a method of providing communication coverage to an unmanned aerial vehicle (UAV) by one or more ground relays, in accordance with embodiments of the disclosure.

FIG. 5 is a flow chart illustrating a method of providing communication coverage to an unmanned aerial vehicle (UAV) by one or more ground relays, in accordance with embodiments of the disclosure. In some embodiments, a proposed flight path of a UAV may be collected, and one or more locations for providing one or more relays may be determined based on a public communications signal distribution along the flight path. In some embodiments, the method 500 of providing communication coverage to UAV may be performed by a system. Alternatively, the method 500 of providing communication coverage to UAV may be performed by a single apparatus such as another UAV.

In step 502, a proposed flight path of a UAV may be collected. In some embodiments, the UAV may have a proposed flight path which is planned before the UAV taking off. In some instances, the proposed path of UAV may be planned for completing a particular mission, such as inspecting a power line, package delivering, or patrolling a national boundary, etc. The proposed flight path may be fixed after it is planned.

In step 504, a communication signal distribution along the proposed flight path of the UAV may be determined. In some embodiments, the communication signal distribution may be a cellular signal distribution along the proposed flight path of the UAV. Alternatively, the communication signal distribution may be a quality of cellular signal. Optionally, the communication signal distribution may be a degree of congestion in communication capacity. Here, the communication signal distribution may be measure within a three-dimensional airspace. In some instances, communication signal distribution may be measured or estimated at an altitude the UAV is flying along the flight path.

In some embodiments, determining the communication signal distribution along the proposed flight path may include detecting one or more areas where a quality of communication signal falls beneath a threshold value. For instance, if the UAV is flying within a region where the quality of cellular signal falls beneath a threshold value, the UAV may not directly communicate with the cellular communication network, and a relay may be needed to relay the UAV communication to the cellular communication network. In some instances, the information about one or more areas where a quality of communication signal falls beneath a threshold value may be collected by analyzing information about a distribution of base stations and coverages of base stations in the cellular communication network. Optionally, the information about one or more areas where a quality of communication signal falls beneath a threshold value may be collected from a cellular service provider. For instance, the user may plan a flight path of UAV, input the planned flight path to an online enquiry system provided by the cellular service provider, and obtain necessary information about a cellular communication coverage and/or a cellular signal distribution along the flight path.

Alternatively, determining the communication signal distribution may include flying another aerial vehicle along the proposed flight path to collect the communications signal distribution. For instance, after a flight path of UAV is planned, a testing aerial vehicle such as a UAV may fly along the planned flight path to collect necessary information. The testing aerial vehicle may carry a device for measuring a quality of the communication network, and collect the information about a cellular communication coverage and/or a cellular signal distribution along the planned flight path, such that the communication signal distribution along the planned flight path may be collected before UAV is taking off.

Alternatively, determining the communication signal distribution may include incorporating past experience data collective from other UAVs. Alternatively, determining the communication signal distribution may include incorporating past experience data collective from a communication service provider. For instance, after a flight path of UAV is planned, the user may input the planned flight path to an online enquiry system. The online enquiry system may be an information sharing platform for sharing past communication signal distribution information associated with locations, which may be collected from past flights of other UAVs or past experience data collective from a communication service provider.

Alternatively, determining the communication signal distribution may include receiving a preset setting of a communication service provider. For instance, the communication service provider may set one or more areas as "areas to avoid" in view that the one or more areas may normally have a large number of communication users and thus a congestion in communication may happen. The settings for the one or more areas may be received from the communication service provider, and one or more relays may be accordingly disposed to provide communications for UAV in the one or more areas, such that the UAV may communicate with telecommunication network through the one or more relays when the UAV is flying within the one or more areas.

Alternatively, determining the communication signal distribution along the proposed flight path includes detecting one or more areas where an available bandwidth for the UAV falls beneath a threshold value. In some instances, the UAV may not be assigned with a requested bandwidth at an area where a quality of communication signal is above a predetermined value. For instance, a lack of communication resource such as a bandwidth may happen due to a large number of communication users within a cellular cell. In this case, although the quality of communication signal is satisfactory within the cellular cell, the UAV may have to communicate with another cell in view that the requested bandwidth cannot be satisfied within the cellular cell.

Alternatively, determining the communication signal distribution may include determining the communications signal distribution based on real-time notice from a communication service provider. In some instances, the communication signal distribution at a location may vary. For instance, a quality of communication signal at a location may vary due to a weather change. For another instance, a degree of congestion in communication capacity at a particular location may vary due to a change in a number of communication users at this location. In some embodiments, a change in the communication signal distribution at a particular location or along a flight path may be determined based on real-time notice from a communication service provider.

Optionally, determining the communication signal distribution may include detecting a quality of communications network along the proposed flight path of the UAV. In some instances, detecting a quality of communications network along the proposed flight path of the UAV may include flying another aerial vehicle along the proposed flight path to collect the information about quality of communications network. For instance, after a flight path of UAV is planned, a testing aerial vehicle such as a UAV may fly along the planned flight path to collect necessary information about the quality of communications network. The testing aerial vehicle may carry a device for measuring a quality of communications network, and collect the information about a communication coverage and/or a communication signal distribution along the planned flight path, such that the communication signal distribution along the planned flight path may be collected before formally flying the UAV which undertake a mission.

In step 506, one or more locations for providing one or more relays may be determined based on the communications signal distribution determined in step 504. In some embodiments, the one or more relays may be stationary. For instance, the one or more relays may be disposed at fixed locations where a quality of public communications signal exceeds a threshold value for the one or more relays and a signal coverage of the one or more relays may cover one or more areas where a quality of public communications signal is below a threshold value for the UAV. Alternatively, the one or more relays may be movable. For instance, the one or more relays may be carried on a movable object such as a ground vehicle. For another instance, the one or more relays may be other aerial vehicles such as UAVs.

In some embodiments, each of the one or more relays may provide (1) a first communication mode capable of directly communicating with the UAV, and (2) a second communication mode capable of communicating over a communications network, to improve communications signal distribution along the proposed flight path of the UAV, as discussed hereinabove. In some instance, for a location where a quality of public communications signal is below a threshold value for the UAV, a relay may be provided to provide a communication between the UAV and the relay. Therefore, the UAV may communicate with the public communications system via the relay even at locations where a quality of public communications signal is below a threshold value for the UAV.

In some embodiments, the method 500 of providing communication coverage to a UAV may further comprise modifying the proposed flight path of the UAV. In some instance, if the communications signal distribution of the original proposed flight path is not satisfactory, the user may modify the original proposed flight path of the UAV. For instance, if it is determined that a plurality of relays should be provided at a large number of locations along the original proposed flight path in step 506, then the original proposed flight path may be modified to reduce the number of relays to be provided so as to reduce a cost. In some embodiments, the method 500 of providing communication coverage to a UAV may further comprise modifying the one or more locations of the one or more relays based on the modification to the proposed flight path of the UAV. For instance, if the original proposed flight path of the UAV is to be modified to reduce the number of relays, the one or more locations for providing the one or more relays may be modified based on the new proposed flight path of the UAV by performing similar steps as steps 502, 504 and 506.

In some embodiments, the method of providing communication coverage to a UAV by determining one or more locations for providing one or more relays at one or more locations based on the communications signal distribution may be performed by a single apparatus. In some instances, the apparatus may be an aerial vehicle such as an unmanned aerial vehicle (UAV). In some embodiments, the apparatus may comprise one or more processors configured to, individually or collectively, perform the steps 502, 504 and 506 as discussed hereinabove. For instance, a testing UAV may comprise one or more processors configured to, individually or collectively, collect a proposed flight path of the UAV, determine a communication signal distribution along the proposed flight path of the UAV, and generate signals for providing one or more relays at one or more locations based on the communications signal distribution. A user terminal may deploy one or more relay based on the signal indicative of the one or more locations as generated by the testing UAV.

Alternatively, the method of providing communication coverage to a UAV by determining one or more locations for providing one or more relays at one or more locations based on the communications signal distribution may be performed by a system. In some embodiments, the system may comprise an aerial vehicle configured to collect a communications signal distribution along a proposed flight path of the UAV, and a device configured to determine one or more locations for providing one or more relay devices based on the communications signal distribution.

Figure 6:
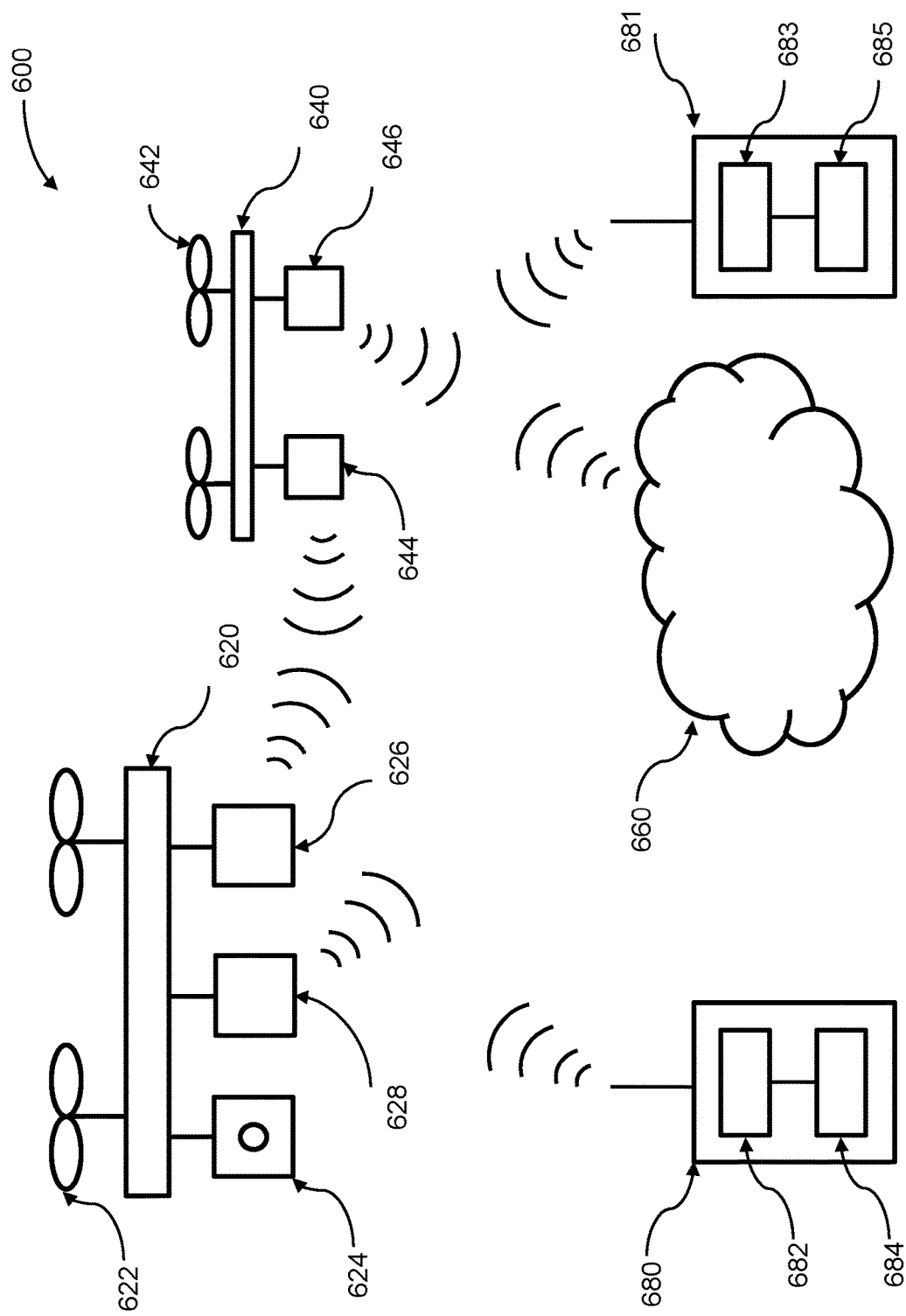
FIG. 6 shows an illustration of a mobile relay disposed for an unmanned aerial vehicle (UAV), in accordance with some embodiments of the disclosure.

FIG. 6 shows an illustration of a mobile relay disposed for an unmanned aerial vehicle (UAV), in accordance with some embodiments of the disclosure. The UAV 620 may have one or more propulsion units 622 that may permit the UAV to move about in the air. In some embodiments, the UAV may carry onboard an image sensor 624 such as a camera, a dedicated communication unit 626 and a cellular communication unit 628. The dedicated communication unit may directly communicate with one or more mobile relays 640 via a dedicated link such as a Wi-Fi link. The cellular communication unit 628 may directly communicate with a communication network 660 such as a cellular network at locations where a quality of public communication signal exceeds a threshold value.

In some embodiments, the mobile relay 640 may be an unmanned aerial vehicle (UAV) carrying a first communication unit 644 capable of directly communicating with the dedicated communication unit of the UAV, and a second communication unit 646 connected to the first communication unit and capable of communicating over communication network 660.

In some embodiments, the first communication unit 644 of the mobile relay 640 may be a wireless transceiver dedicated to a communication between the UAV and the mobile relay. In some instances, the wireless transceiver may be a Wi-Fi transceiver. Optionally, the wireless transceiver may be a RF (radio frequency) transceiver. Optionally, the wireless transceiver may be a private wireless transceiver. Accordingly, the dedicated communication unit 626 of the UAV 620 may be a Wi-Fi transceiver. Optionally, the dedicated communication unit may be a RF (radio frequency) transceiver. Optionally, the dedicated communication unit may be a private wireless transceiver.

In some embodiments, the first communication unit 644 of the mobile relay 640 may be capable of receiving a signal directly from the UAV. The signal received from the UAV may be transmitted to communication network via the second communication unit 646. In some instances, the signal received from the UAV may include information about a multimedia file captured by the UAV. For instance, the multimedia file may be images or videos captured by a camera onboard the UAV. Optionally, the signal received from the UAV may include sensor data collected by one or more sensors onboard the UAV. In some embodiments, the first communication unit of the mobile relay may be capable of transmitting a signal directly to the UAV. In some instances, the signal transmitted to the UAV may include one or more commands that effect an operation of the UAV. For instance, the one or more commands may affect a flight of the UAV or an operation of a payload of the UAV. In some instances, the one or more commands may originate from a remote controller which is configured to accept a user input.

In some embodiments, the second communication unit 646 of the mobile relay 640 may a cellular communication unit. The data received by the second communication unit may be transmitted to the UAV via the first communication unit 644. In some instances, the second communication unit may be configured to communicate with a remote controller over the communications network. Optionally, the second communication unit may be configured to receive one or more commands that effect operation of the UAV. For instance, a user may input UAV operation commands into a remote controller such as a mobile phone or a personal computer which is connected to the communication network. The user's UAV operation commands may be transmitted from the remote controller to the second communication unit of the mobile relay through the communication network, and then to the UAV via the dedicated communication link between the first communication unit of the mobile relay and the dedicated communication unit of the UAV, such that the UAV may be operated according to user's UAV operation commands. In some instances, the second communication unit may be configured to transmit information about a multimedia file captured by the UAV. Optionally, the second communication unit may be configured to transmit sensor data collected by one or more sensors onboard the UAV. For instance, images or videos captured by a camera onboard the UAV and various sensor date collected by sensors onboard the UAV may be transmitted from the dedicated communication unit of the UAV to the first communication unit of the mobile relay, and then to the communication network through the second communication unit of the mobile relay, such that the images and video may be shared on a social network or viewed by the user.

By providing one or more mobile relays based on the communication signal distribution, the UAV may communicate with the communication network along the entire flight path. In some instances, at locations where a quality of public communication exceeds a threshold value, the UAV may directly communicate with the communication network through the onboard public communication unit. Optionally, at locations where a quality of public communication falls beneath the threshold value, the UAV may communicate with the communication network through the one or more mobile relays which fly within a proximity of the UAV.

In some embodiments, a flight path of the UAV may be a proposed flight path which is scheduled before the UAV taking off. Alternatively, a flight path of the UAV may be a ransom flight path. For instance, a flight of the UAV may be controlled by a user in a real-time manner.

In some embodiments, the one or more locations of the one or more mobile relays may change over time while the UAV is in flight. In some instances, the one or more mobile relays may stay within a proximity of the UAV while the UAV is in flight. For instance, the mobile relay may stay within a certain distance from the UAV while the UAV is in flight, such that the UAV and the mobile relay may directly communicate with each other via the dedicated link established between the dedicated communication unit of the UAV and the first communication unit of the mobile relay while the UAV is in flight. Optionally, the locations of the one or more mobile relays may permit each of the mobile relays to have a quality of public communications signal that exceeds a threshold value. For instance, the mobile relay itself may stay at a location or a region having a good quality of cellular signal so that the mobile relay may communicate with the cellular communication network while the UAV is in flight. Optionally, the locations of the one or more mobile relays may permit each of the mobile relays to have a ground communication load falling beneath a threshold value. For instance, the mobile relay may stay at locations or regions where a degree of congestion in communication capacity of the cellular communication network falls beneath a certain value while the UAV is in flight.

In some embodiments, an identification of the UAV may be authenticated through the entire flight path. In some instances, when the UAV flies at location where the UAV can directly communicate with the communication network, the identification of the UAV may be authenticated by checking and confirming the identification with an authentication center on the communication network. For instance, if the authentication fails, the UAV may be forced to land. Optionally, when the UAV flies at location where the UAV cannot directly communicate with the communication network, the identification of the UAV may be performed by one or more mobile relays which may communicate with the communication network. For instance, the one or more mobile relays may request an identification of the UAV which directly communicates with the one or more mobile relays, and send the identification of the UAV to an authentication center on the communication network.

In some embodiments, since the UAV may directly communicate with the communication network or communicate with the communication network via one or more mobile relays during the entire flight path, a user terminal which can directly communicate with the UAV may also communicate with the communication network via the UAV even if the user terminal does not have a public communication capacity. In some instances, the user terminal such as a remote controller, a personal computer, or a mobile device may comprise a fifth communication unit 682 which may directly communicate with the dedicated communication unit 426 via a dedicated link such as a Wi-Fi link. For instances, at locations where the UAV can directly communicate with the cellular communication network, a communication from the user terminal may be received by the UAV via a dedicated link established between the fifth communication unit of the user terminal and the dedicated communication unit of the UAV, and then relayed to the cellular communication network via a cellular link established between the cellular communication unit of the UAV and the cellular communication network. Optionally, at locations where the UAV cannot directly communicate with the cellular communication network, a communication from the user terminal may be received by the UAV via a dedicated link established between the fifth communication unit of the user terminal and the dedicated communication unit of the UAV, then relayed to the mobile relay via a dedicated link established between the dedicated communication unit of the UAV and the first communication unit of the mobile relay, and then relayed to the cellular communication network via a cellular link established between the cellular communication unit of the UAV and the cellular communication network.

Alternatively, the fifth communication unit 682 of the user terminal 680 may directly communicate with the first communication unit 642 of the mobile relay 640. In some instances, the user terminal having no public communication capacity may communicate with the mobile relay via a dedicated link established between the fifth communication unit of the user terminal and the first communication unit of the mobile relay, then the second communication unit 644 of the mobile relay may relay the communication from the user terminal to the communication network.

In some embodiments, in addition to the fifth communication unit 682 which may directly communicate with the dedicated communication unit 626 of the UAV via a dedicated link such as a Wi-Fi link, the user terminal may comprise a six communication unit 684 which may communicate with the public communication system network. In some instances, the user terminal such as a mobile phone may receive a user's input and transmit the user's input to the UAV via the communication network, at locations where the UAV can directly communicate with the communication network. For instances, a user may input a flight command to a user terminal such as a mobile phone, the flight command may be transmitted to the cellular network via a cellular link between the mobile phone and the cellular network and then to the UAV via a cellular link between the cellular network and the UAV. Optionally, the user terminal such as a mobile phone may receive a user's input and transmit the user's input to the UAV via the mobile relay, at locations where the UAV cannot directly communicate with the communication network. For instances, a user may input a flight command to a user terminal such as a mobile phone, the flight command may be transmitted to the cellular network via a cellular link between the mobile phone and the cellular network, then to the mobile relay via the cellular link between the cellular network and the relay, and then to the UAV via a Wi-Fi link between the mobile relay and the UAV.

In some embodiments, the UAV 620 may communicate with the communication network 660 via the user terminal 680 which comprises the fifth communication unit 682 and the six communication unit 684, at locations where the user terminal can communicate with the communication network. The user terminal may be a remote controller, a personal computer, a server, or a mobile device. In some embodiments, the fifth communication unit of the user terminal may directly communicate with the dedicated communication unit 626 of the UAV 620, and the six communication unit of the user terminal may communicate with the public communication system network. In some instances, the UAV may directly communicate with the user terminal through a dedicated link established between the dedicated communication unit of the UAV and the fifth communication unit 682, and the user terminal may then communicate with the communication network though a public communication link between the six communication unit of the user terminal and the communication network, at locations where the user terminal can communicate with the communication network.

In some embodiments, the UAV 620 may communicate with the communication network 660 via a second user terminal which can communicate with the mobile relay, at locations where the second user terminal can communicate with the communication network. In some instances, as shown in FIG. 6, the second user terminal 681, which can communicate with the mobile relay 640, may comprise a seventh communication unit 683 and an eighth communication unit 685. The second user terminal 681 may be a remote controller, a personal computer, a server, or a mobile device. In some embodiments, the sixth communication unit of the second user terminal may directly communicate with the first communication unit 644 of the mobile relay 642, and the eighth communication unit of the second user terminal may communicate with the public communication system network. In some instances, the UAV may directly communicate with the mobile relay through a dedicated link established between the dedicated communication unit of the UAV and the first communication unit 644, and the mobile relay may then communicate with the second user terminal 681 through a dedicated link established between the first communication unit of the mobile relay and the seventh communication unit 683 of the second user terminal, and then the user terminal may communicate with communication network though a public communication link between the eighth communication unit of the second user terminal and the communication network, at locations where the second user terminal 681 can communicate with the communication network.

As discussed hereinabove, the UAV may communicate with the communication network without a relay of the one or more mobile relays if the UAV can directly communicate with the communication network or the UAV can communicate with the communication network via the user terminal. In some instances, the user terminal may be a device which can directly communicate with the UAV through a dedicated communication link other than a public communication link.

As discussed hereinabove, the UAV may communicate with the communication network via a relay of the one or more mobile relays if the UAV can communicate with the communication network via one or more mobile relays only or the UAV can communicate with the communication network via the one or more mobile relays and the second user terminal. In some instances, the second user terminal may be a device which can directly communicate with the mobile relays through a dedicated communication link other than a public communication link.

Figure 7:
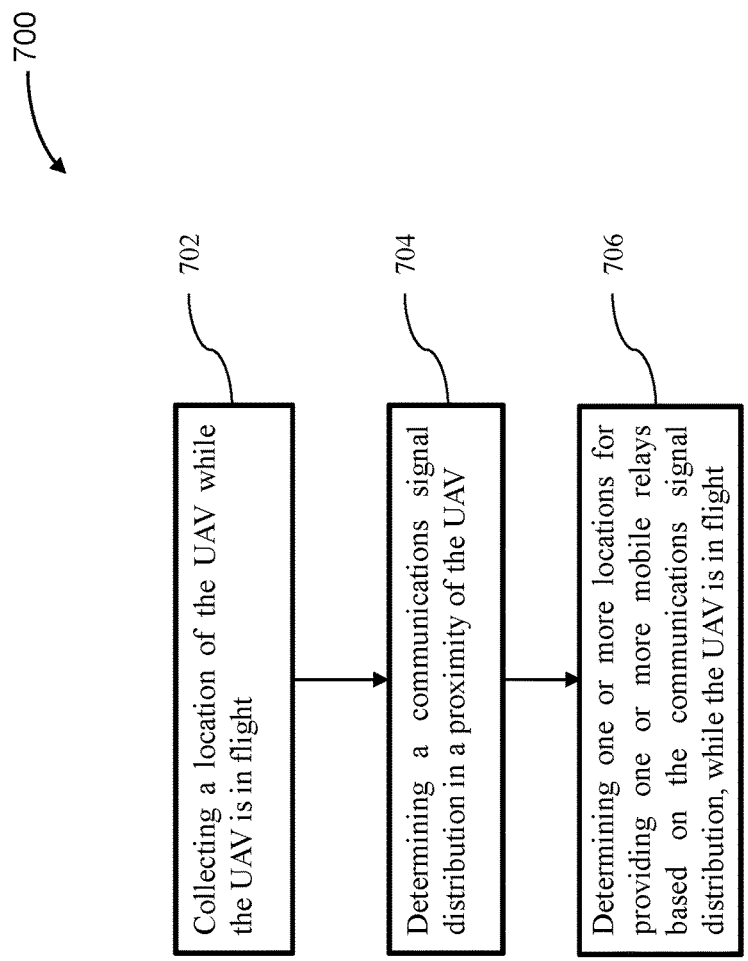
FIG. 7 is a flow chart illustrating a method of providing communication coverage to an unmanned aerial vehicle (UAV) by one or more mobile relays, in accordance with embodiments of the disclosure.

FIG. 7 is a flow chart illustrating a method of providing communication coverage to an unmanned aerial vehicle (UAV) by one or more mobile relays, in accordance with embodiments of the disclosure. In some embodiments, a location of the UAV may be collected while the UAV is in flight, a communication signal distribution in a proximity of the UAV may be determined, and one or more locations for providing one or more mobile relays may be determined based on the communication signal distribution, while the UAV is in flight. In some embodiments, the method 700 of providing communication coverage to UAV may be performed by a system or a single apparatus such as another UAV.

In step 702, a location of the UAV may be collected while the UAV is in flight. In some embodiment, the location information of the UAV may be collected from a GPS (Global Positioning System) module onboard the UAV. Alternatively, the location information of the UAV may be collected by one or more mobile relays which may follow the UAV while the UAV is in flight. Alternatively, the location information of the UAV may be collected from a proposed or scheduled flight path of the UAV. Optionally, the location information of the UAV may be collected by user terminals such as a radar.

In step 704, a communication signal distribution in a proximity of the UAV may be determined. In some embodiments, the communication signal distribution may be a quality of cellular signal in a proximity of the UAV. Alternatively, the communication signal distribution may be a degree of congestion in communication capacity in a proximity of the UAV.

In some embodiments, determining a communications signal distribution in a proximity of the UAV may include detecting a quality of communications network in a proximity of the UAV. In some instances, the quality of communications network in a proximity of the UAV may be detected by one or more mobile relays which may follow the UAV while the UAV is in flight.

Alternatively, determining a communications signal distribution in a proximity of the UAV may include incorporating past experience data collective from other UAVs. Alternatively, determining a communications signal distribution in a proximity of the UAV includes incorporating past experience data collective from a communication service provider. For instance, the information about a communications signal distribution may be received from an online enquiry system. The online enquiry system may be an information sharing platform for sharing past communication signal distribution information associated with locations, which may be collected from past flights of UAVs or past experience data collective from a communication service provider.

Optionally, determining a communications signal distribution in a proximity of the UAV includes determining the communications signal distribution based on real-time notice from a communication service provider. In some instances, the communication signal distribution at a location may vary. For instance, a quality of communication signal at a location may vary due to a weather change. For another instance, a degree of congestion in communication capacity at a particular location may vary due to a change in a number of communication users at this location. In some embodiments, a change in the communication signal distribution at a particular location or along a flight path may be determined based on real-time notice from a communication service provider.

In step 706, one or more locations for providing one or more mobile relays may be determined based on the communication signal distribution, while the UAV is in flight. In some embodiments, the mobile relay may be an aerial vehicle such as a UAV which comprises a public communication unit and a dedicated communication unit. In some embodiments, the one or more mobile relays may be disposed at fixed locations where a quality of public communications signal exceeds a threshold value for the one or more mobile relays and a signal coverage of the one or more relays may cover one or more areas where a quality of the public communications signal is below a threshold value for the UAV. For instance, the one or more mobile relays may be provided at fixed locations as determined and may not fly around, and provide a cellular communication relay for the UAV while the UAV is flying within a region where the UAV cannot directly communicate with the cellular communication system. Alternatively, the one or more mobile relays may be movable over one or more aerial paths. For instance, a mobile relay may fly along an aerial path in order to follow the UAV within a range of the aerial path, and provide a cellular communication relay for the UAV while the UAV is flying within a region where the UAV cannot directly communicate with the cellular communication system. Within the range of the aerial path, the mobile relays may directly communicate with the public communication system.

In some embodiments, the one or more mobile relays may be provided at an altitude lower than the UAV. Alternatively, the one or more mobile relays may be provided at an altitude substantially identical to the UAV. Optionally, the one or more mobile relays may be provided at an altitude higher than the UAV. In some embodiments, the one or more mobile relays may be provided at a location ahead of the UAV while the UAV is in flight. Alternatively, the one or more mobile relays may be provided at a location behind of the UAV while the UAV is in flight. Optionally, the one or more mobile relays may be provided at a location at a lateral side of the UAV while the UAV is in flight.

In some embodiments, each of the one or more mobile relays may provide (1) a first communication mode capable of directly communicating with the UAV and (2) a second communication mode capable of communicating over a communication network, to improve communications signal distribution along a flight path of the UAV. At a location where the UAV cannot directly communicate with the communication network, more than one mobile relays may be provided to cover a larger region where the more than one mobile relays may provide relay of public communication to the UAV.

In some embodiments, the method 700 of providing communication coverage to an unmanned aerial vehicle (UAV) by one or more mobile relays may further comprise determining whether the UAV is capable of communications over the communication network at a predetermined level of quality based on the communication signal distribution. In some instances, when the UAV is capable of communications over the communication network at the predetermined level of quality, the UAV may be permitted to communicate over the communication network without using the one or more mobile relays. Optionally, when the UAV is not capable of communications over the communication network at the predetermined level of quality, the UAV may be permitted to communicate with the first communication unit of the one or more mobile relays. The first communication unit of the mobile relay may be a dedicated communication unit which can establish a dedicated link with the UAV.

In some embodiments, the method 700 of providing communication coverage to an unmanned aerial vehicle (UAV) by one or more mobile relays may further comprise determining whether the UAV is capable of direct communications with a remote controller at a predetermined level of quality. In some instances, when the UAV is capable of directly communicating with the remote controller at the predetermined level of quality, the UAV may be permitted to communicate directly with the remote controller without using the one or more relays. Optionally, when the UAV is not capable of directly communicating with the remote controller at the predetermined level of quality, the UAV may be permitted to communicate with the first communication unit of the one or more relays. For instance, a user terminal as shown in FIG. 6 may relay a communication from the UAV to the public communication system when the UAV is capable of directly communicating with the user terminal at the predetermined level of quality and the user terminal can communicate with the public communication system, as discussed hereinabove.

Figure 8:
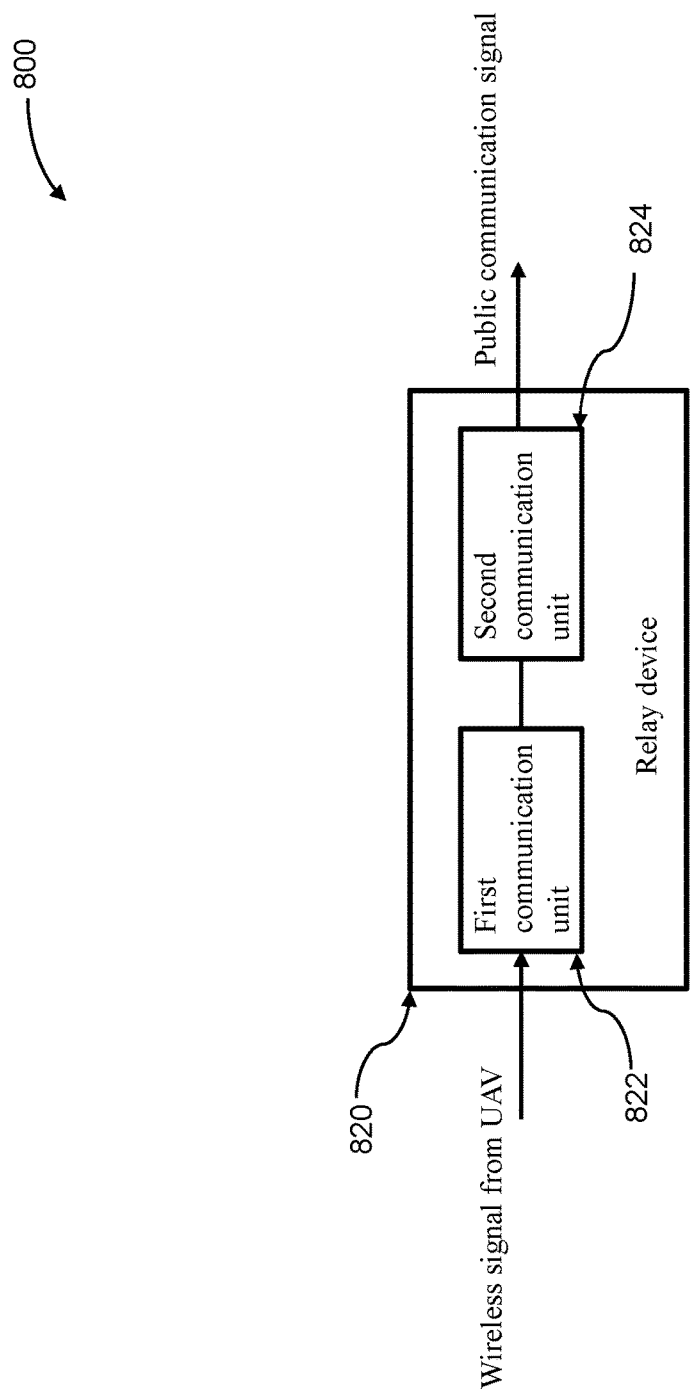
FIG. 8 shows a block diagram of a relay device of relaying communications from an unmanned aerial vehicle (UAV), in accordance with some embodiments of the disclosure.

FIG. 8 shows a block diagram of a relay device of relaying communications from an unmanned aerial vehicle (UAV), in accordance with some embodiments of the disclosure. In some embodiments, the relay device 820 may relay communications from an unmanned aerial vehicle (UAV) to a communication network. In some instances, the relay device may be a stationary relay device. Optionally, the relay device may be a movable relay device such as a relay device carried on a movable vehicle. Optionally, the relay device may be a mobile relay device such as another UAV.

In some embodiments, the relay device 820 may comprise a first communication unit 822 and a second communication unit 824 which is connected to the first communication unit. In some embodiments, the first communication unit may be configured to receive a wireless signal directly from the UAV. The wireless signal received from the UAV may convey a digital file information such as image or video captured by a camera onboard the UAV or sensor data collected by various sensors onboard the UAV. In some instances, the first communication unit may be a wireless transceiver dedicated to communication between the UAV and the relay device, such as a Wi-Fi transceiver. In some embodiments, the second communication unit may be configured to transmit a public communication signal over a public network. The public communication signal may convey the digital file information. In some embodiments, the communication network may be a cellular network, and the second communication unit may be a cellular communication unit.

In some embodiments, a remote controller may be configured to receive the public communication signal from the public network. In some instances, the remote controller may be configured to accept a user input that generates a UAV operation command. For instance, the remote controller may be a server, a personal computer, or a mobile terminal.

Figure 9:
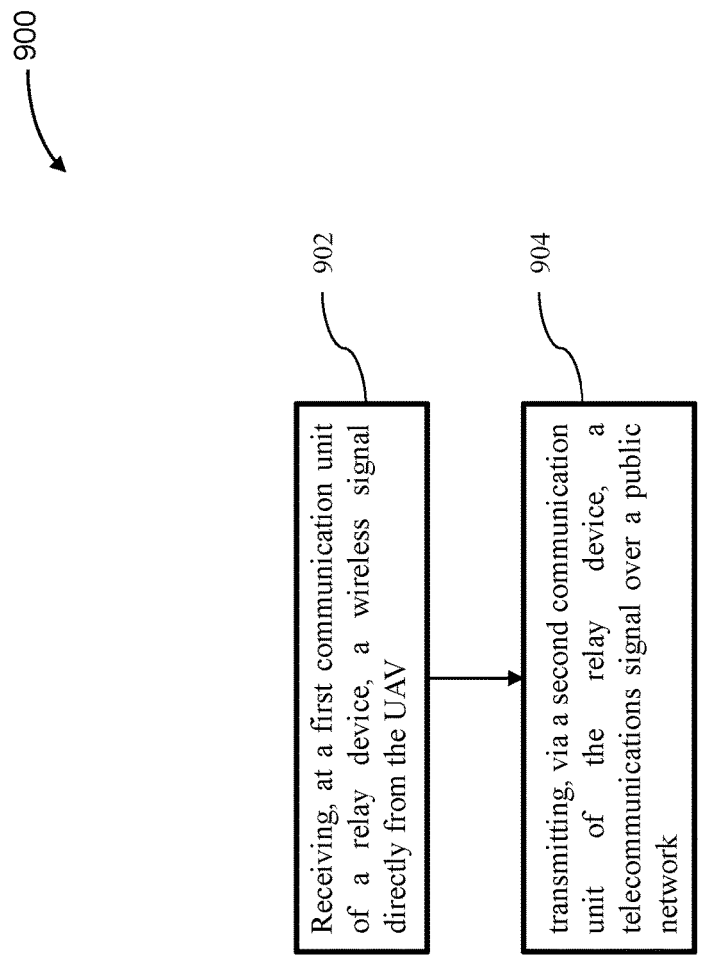
FIG. 9 is a flow chart illustrating a method of relaying communications from an unmanned aerial vehicle (UAV), in accordance with embodiments of the disclosure.

FIG. 9 is a flow chart illustrating a method of relaying communications from an unmanned aerial vehicle (UAV), in accordance with embodiments of the disclosure.

In some embodiments, in step 902, a wireless signal directly from the UAV may be received at a first communication unit of a relay device. In some embodiments, in step 904, a communications signal over a public network may be transmitted via a second communication unit of the relay device. In some embodiments, the communications signal may conveys the wireless signal.

Figure 10:
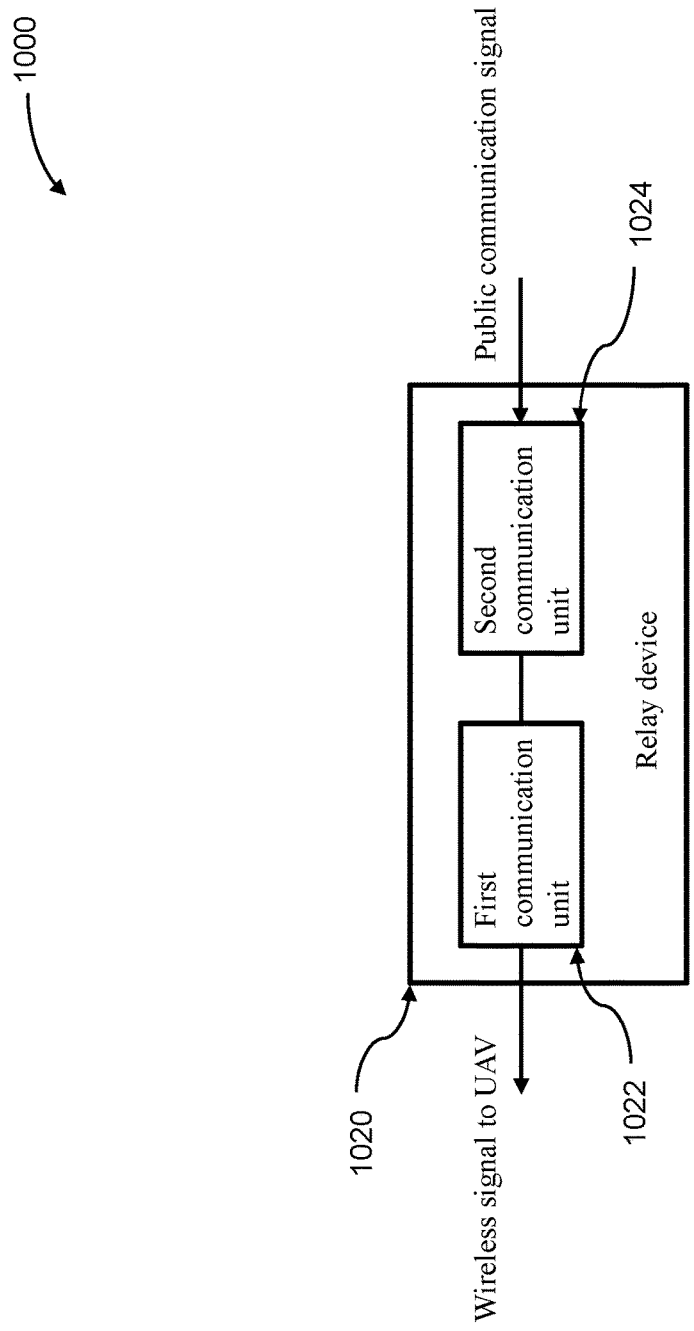
FIG. 10 shows a block diagram of a relay device of relaying communications to an unmanned aerial vehicle (UAV), in accordance with some embodiments of the disclosure.

FIG. 10 shows a block diagram of a relay device of relaying communications to an unmanned aerial vehicle (UAV), in accordance with some embodiments of the disclosure. In some embodiments, the relay device 1020 may relay communications from a communication network to an unmanned aerial vehicle (UAV). In some instances, the relay device may be a stationary relay device. Optionally, the relay device may be a movable relay device such as a relay device carried on a movable vehicle. Optionally, the relay device may be a mobile relay device such as another UAV.

In some embodiments, the relay device 1020 may comprise a second communication unit 1024 and a first communication unit 1022 which is connected to the second communication unit. In some embodiments, the second communication unit may be configured to receive a public communication signal from over a public network. In some instances, the public network may be a communications network. For instance, the communication network may be a cellular network, and the second communication unit may be a cellular communication unit. In some embodiments, the first communication unit may be a wireless transceiver dedicated to communication between the UAV and the relay device, such as a Wi-Fi transceiver.

In some embodiments, the public communication signal may convey a UAV operation command. In some instances, the UAV operation command may affect a flight of the UAV. Optionally, the UAV operation command may affect an operation of a payload carried by the UAV. Optionally, the UAV operation command may affect a positioning of a payload carried by the UAV, relative to the UAV. For instances, the UAV operation command may affect a rotation of a gimbal carried by the UAV. In some embodiments, a remote controller may be configured to receive a user input that generates the UAV operation command.

Figure 11:
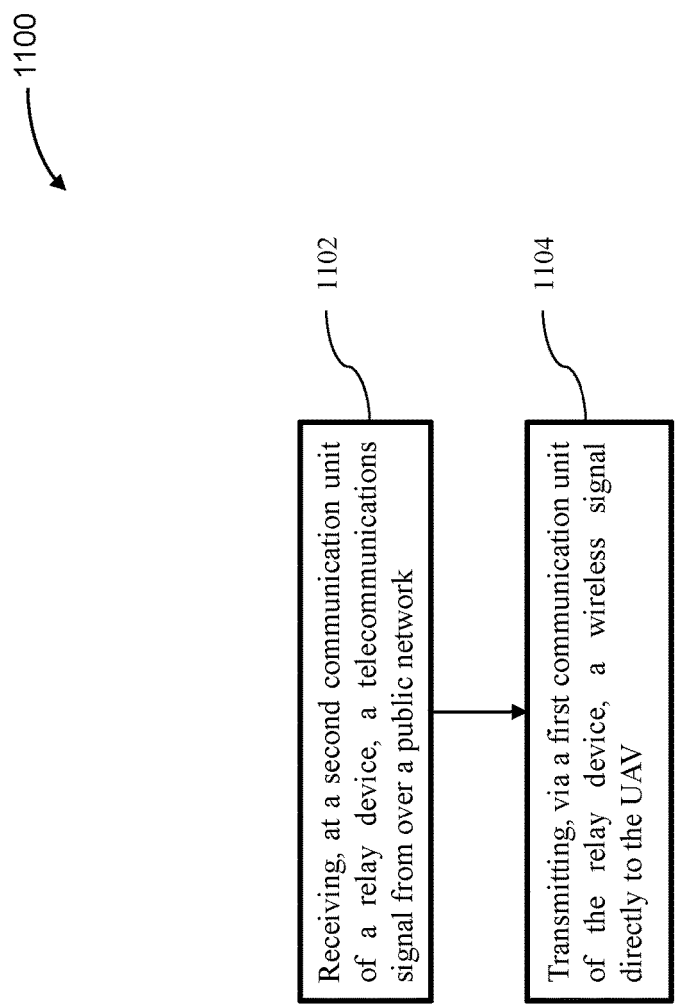
FIG. 11 is a flow chart illustrating a method of relaying communications to an unmanned aerial vehicle (UAV), in accordance with embodiments of the disclosure.

FIG. 11 is a flow chart illustrating a method of relaying communications to an unmanned aerial vehicle (UAV), in accordance with embodiments of the disclosure.

In some embodiments, in step 1102, a communications signal from over a public network may be received at a second communication unit of a relay device. In some instances, the communications signal may convey a UAV operation command. In some embodiments, in step 1104, a wireless signal directly to the UAV, the wireless signal conveying the UAV operation command may be transmitted via a first communication unit of the relay device.

The systems, devices, and methods described herein can be applied to a wide variety of objects, including movable objects and stationary objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, altitude, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 12:
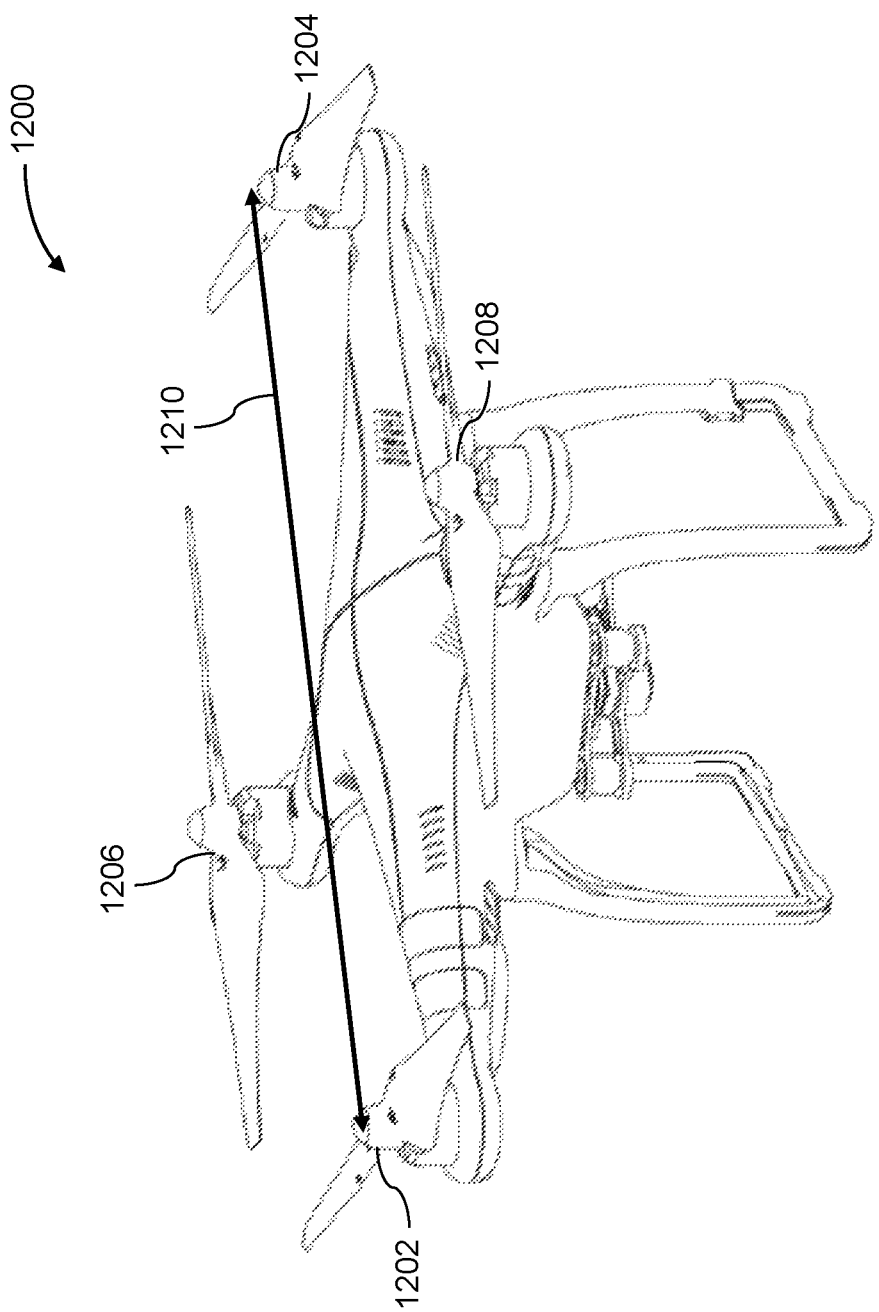
FIG. 12 illustrates an appearance of UAV in accordance with embodiments of the present disclosure.

FIG. 12 illustrates an unmanned aerial vehicle (UAV) 1200, in accordance with embodiments of the present disclosure. The UAV may be an example of a movable object as described herein, to which the method and apparatus of discharging a battery assembly may be applied. The UAV 1200 can include a propulsion system having four rotors 1202, 1204, 1206, and 1208. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1210. For example, the length 1210 can be less than or equal to 2 m, or less than equal to 5 m. In some embodiments, the length 1210 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 13:
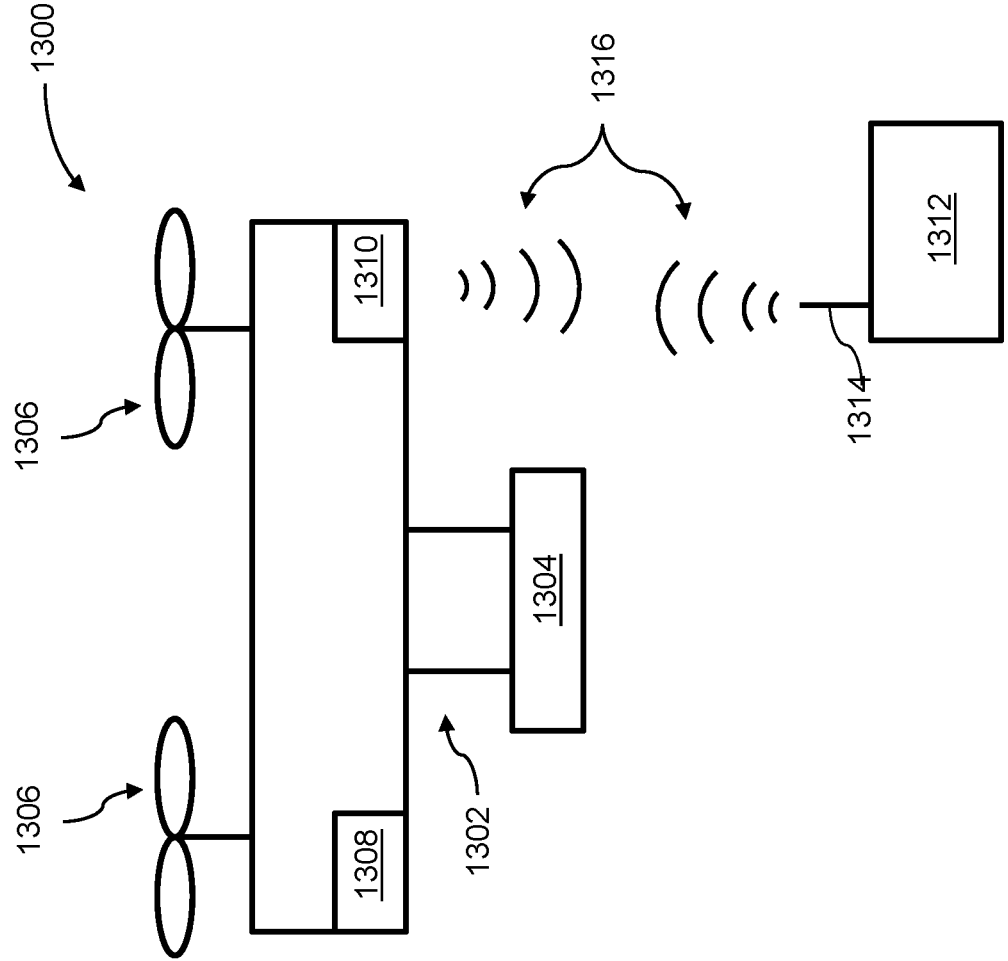
FIG. 13 illustrates a movable object including a carrier and a payload, in accordance with embodiments of the present disclosure.

FIG. 13 illustrates a movable object 1300 including a carrier 1302 and a payload 1304, in accordance with embodiments of the present disclosure. Although the movable object 1300 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1304 may be provided on the movable object 1300 without requiring the carrier 1302. The movable object 1300 may include propulsion mechanisms 1306, a sensing system 1308, and a communication system 1310.

The propulsion mechanisms 1306 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1306 can be mounted on the movable object 1300 using any suitable means, such as a support element (e.g., a drive shaft) as described elsewhere herein. The propulsion mechanisms 1306 can be mounted on any suitable portion of the movable object 1300, such on the top, bottom, front, back, sides, or suitable combinations thereof.

In some embodiments, the propulsion mechanisms 1306 can enable the movable object 1300 to take off vertically from a surface or land vertically on a surface without requiring any horizontal movement of the movable object 1300 (e.g., without traveling down a runway). Optionally, the propulsion mechanisms 1306 can be operable to permit the movable object 1300 to hover in the air at a specified position and/or orientation. One or more of the propulsion mechanisms 1300 may be controlled independently of the other propulsion mechanisms. Alternatively, the propulsion mechanisms 1300 can be configured to be controlled simultaneously. For example, the movable object 1300 can have multiple horizontally oriented rotors that can provide lift and/or thrust to the movable object. The multiple horizontally oriented rotors can be actuated to provide vertical takeoff, vertical landing, and hovering capabilities to the movable object 1300. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1300 (e.g., with respect to up to three degrees of translation and up to three degrees of rotation).

The sensing system 1308 can include one or more sensors that may sense the spatial disposition, velocity, and/or acceleration of the movable object 1300 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1308 can be used to control the spatial disposition, velocity, and/or orientation of the movable object 1300 (e.g., using a suitable processing unit and/or control module, as described below). Alternatively, the sensing system 1308 can be used to provide data regarding the environment surrounding the movable object, such as weather conditions, proximity to potential obstacles, location of geographical features, location of manmade structures, and the like.

The communication system 1310 enables communication with terminal 1312 having a communication system 1314 via wireless signals 1316. The communication systems 1310, 1314 may include any number of transmitters, receivers, and/or transceivers suitable for wireless communication. The communication may be one-way communication, such that data can be transmitted in only one direction. For example, one-way communication may involve only the movable object 1300 transmitting data to the terminal 1312, or vice-versa. The data may be transmitted from one or more transmitters of the communication system 1310 to one or more receivers of the communication system 1312, or vice-versa. Alternatively, the communication may be two-way communication, such that data can be transmitted in both directions between the movable object 1300 and the terminal 1312. The two-way communication can involve transmitting data from one or more transmitters of the communication system 1310 to one or more receivers of the communication system 1314, and vice-versa.

In some embodiments, the terminal 1312 can provide control data to one or more of the movable object 1300, carrier 1302, and payload 1304 and receive information from one or more of the movable object 1300, carrier 1302, and payload 1304 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1306), or a movement of the payload with respect to the movable object (e.g., via control of the carrier 1302). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1308 or of the payload 1304). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1312 can be configured to control a state of one or more of the movable object 1300, carrier 1302, or payload 1304. Alternatively or in combination, the carrier 1302 and payload 1304 can also each include a communication module configured to communicate with terminal 1312, such that the terminal can communicate with and control each of the movable object 1300, carrier 1302, and payload 1304 independently.

In some embodiments, the movable object 1300 can be configured to communicate with another remote device in addition to the terminal 1312, or instead of the terminal 1312. The terminal 1312 may also be configured to communicate with another remote device as well as the movable object 1300. For example, the movable object 1300 and/or terminal 1312 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1300, receive data from the movable object 1300, transmit data to the terminal 1312, and/or receive data from the terminal 1312. Optionally, the remote device can be connected to the Internet or other communications network, such that data received from the movable object 1300 and/or terminal 1312 can be uploaded to a website or server.

Figure 14:
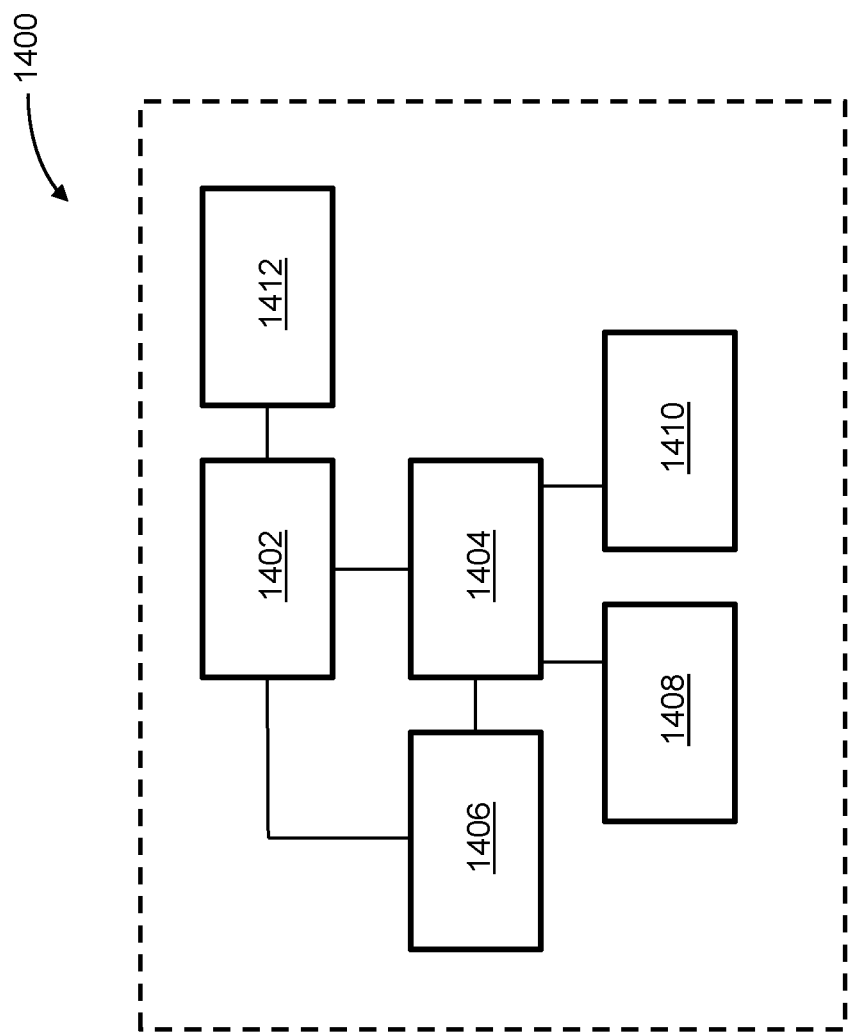
FIG. 14 is a schematic illustration by way of block diagram of a system for controlling a movable object, in accordance with embodiments of the present disclosure.

FIG. 14 is a schematic illustration by way of block diagram of a system 1400 for controlling a movable object, in accordance with embodiments of the present disclosure. The system 1400 can be used in combination with any suitable embodiment of the systems, devices, and methods disclosed herein. The system 1400 can include a sensing module 1402, processing unit 1404, non-transitory computer readable medium 1406, control module 1408, and communication module 1410.

The sensing module 1402 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1402 can be operatively coupled to a processing unit 1404 having a plurality of processors. In some embodiments, the sensing module can be operatively coupled to a transmission module 1412 (e.g., a Wi-Fi image transmission module) configured to directly transmit sensing data to a suitable external device or system. For example, the transmission module 1412 can be used to transmit images captured by a camera of the sensing module 1402 to a remote terminal.

The processing unit 1404 can have one or more processors, such as a programmable processor (e.g., a central processing unit (CPU)). The processing unit 1404 can be operatively coupled to a non-transitory computer readable medium 1406. The non-transitory computer readable medium 1406 can store logic, code, and/or program instructions executable by the processing unit 1404 for performing one or more steps. The non-transitory computer readable medium can include one or more memory units (e.g., removable media or external storage such as an SD card or random access memory (RAM)). In some embodiments, data from the sensing module 1402 can be directly conveyed to and stored within the memory units of the non-transitory computer readable medium 1406. The memory units of the non-transitory computer readable medium 1406 can store logic, code and/or program instructions executable by the processing unit 1404 to perform any suitable embodiment of the methods described herein. For example, the processing unit 1404 can be configured to execute instructions causing one or more processors of the processing unit 1404 to analyze sensing data produced by the sensing module. The memory units can store sensing data from the sensing module to be processed by the processing unit 1404. In some embodiments, the memory units of the non-transitory computer readable medium 1406 can be used to store the processing results produced by the processing unit 1404.

In some embodiments, the processing unit 1404 can be operatively coupled to a control module 908 configured to control a state of the movable object. For example, the control module 908 can be configured to control the propulsion mechanisms of the movable object to adjust the spatial disposition, velocity, and/or acceleration of the movable object with respect to six degrees of freedom. Alternatively or in combination, the control module 1408 can control one or more of a state of a carrier, payload, or sensing module.

The processing unit 1404 can be operatively coupled to a communication module 1410 configured to transmit and/or receive data from one or more external devices (e.g., a terminal, display device, or other remote controller). Any suitable means of communication can be used, such as wired communication or wireless communication. For example, the communication module 1410 can utilize one or more of local area networks (LAN), wide area networks (WAN), infrared, radio, WiFi, point-to-point (P2P) networks, communication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1410 can transmit and/or receive one or more of sensing data from the sensing module 1402, processing results produced by the processing unit 1404, predetermined control data, user commands from a terminal or remote controller, and the like.

The components of the system 1400 can be arranged in any suitable configuration. For example, one or more of the components of the system 1400 can be located on the movable object, carrier, payload, terminal, sensing system, or an additional external device in communication with one or more of the above. Additionally, although FIG. 14 depicts a single processing unit 1404 and a single non-transitory computer readable medium 1406, one of skill in the art would appreciate that this is not intended to be limiting, and that the system 1400 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 900 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method of providing communication coverage comprising:
    collecting, by a processor, a location of an unmanned aerial vehicle (UAV) while the UAV is in flight;
    receiving, by the processor, a communication signal distribution in a proximity of the UAV detected by one or more mobile signal detectors; and
    determining, by the processor, one or more locations for arranging one or more relays based on the communication signal distribution to improve communication signal coverage along a flight path of the UAV, the one or more locations being one or more fixed locations where a quality of public communications signal exceeds a first threshold value, and a signal coverage of the one or more relays arranged at the one or more fixed locations include one or more areas in which the quality of public communications signal is below a second threshold value.

2. The method of claim 1, wherein determining the communication signal distribution includes detecting, by the processor, a quality of telecommunication network signal in the proximity of the UAV.

3. The method of claim 1, wherein determining the communication signal distribution includes detecting, by the processor, a degree of congestion in communication capacity in the proximity of the UAV.

4. The method of claim 1, wherein the one or more mobile signal detectors follow the UAV while the UAV is in flight.

5. The method of claim 1, wherein determining the communication signal distribution includes determining, by the processor, a change in the communication signal distribution based on real-time notice from a communication service provider.

6. The method of claim 1, wherein determining the one or more locations for arranging the one or more relays includes determining, by the processor, one or more locations for arranging one or more other UAVs.

7. The method of claim 1, wherein:
    the one or more relays include one or more mobile relays; and
    determining the one or more locations for arranging the one or more relays includes determining a range of the flight path of the UAV for the one or more mobile relays to follow the UAV.

8. The method of claim 1, further comprising:
    determining, by the processor, whether the UAV is capable of directly communicating with a remote controller at a predetermined level of quality;
    instructing, by the processor, the UAV to directly communicate with the remote controller without using the one or more relays in response to the UAV being capable of directly communicating with the remote controller at the predetermined level of quality; and
    instructing, by the processor, the UAV to communicate with the remote controller through at least one of the one or more relays in response to the UAV not being capable of directly communicating with the remote controller at the predetermined level of quality.

9. A method of providing communication coverage comprising:
    collecting, by a processor, a location of an unmanned aerial vehicle (UAV) while the UAV is in flight;
    determining, by the processor, a communication signal distribution in a proximity of the UAV; and
    determining, by the processor, one or more locations for arranging one or more relays based on the communication signal distribution to improve communication signal coverage along a flight path of the UAV;

determining, by the processor, whether the UAV is capable of communicating over a communication network at a predetermined level of quality based on the communication signal distribution;

instructing, by the processor, the UAV to communicate over the communication network without using the one or more relays in response to the UAV being capable of communicating over the communication network at the predetermined level of quality; and instructing, by the processor, the UAV to communicate with at least one of the one or more relays in response to the UAV not being capable of communicating over the communication network at the predetermined level of quality.

10. An apparatus for providing communication coverage comprising:

a processor; and a memory storing program instructions that, when executed by the processor, cause the processor to:

collect a location of an unmanned aerial vehicle (UAV) while the UAV is in flight;

determine a communication signal distribution in a proximity of the UAV; and determine one or more locations for arranging one or more relays based on the communication signal distribution to improve communication signal coverage along a flight path of the UAV, the one or more locations being one or more fixed locations where a quality of public communications signal exceeds a first threshold value, and a signal coverage of the one or more relays arranged at the one or more fixed locations include one or more areas in which the quality of public communications signal is below a second threshold value.

11. The apparatus of claim 10, wherein the communication signal distribution includes a quality of telecommunication network signal in the proximity of the UAV.

12. The apparatus of claim 10, wherein the communication signal distribution includes a degree of congestion in communication capacity in the proximity of the UAV.

13. The apparatus of claim 10, wherein the communication signal distribution is detected by one or more mobile signal detectors that follow the UAV while the UAV is in flight.

14. The apparatus of claim 10, wherein the program instructions further cause the processor to determine a change in the communication signal distribution based on real-time notice from a communication service provider.

15. The apparatus of claim 10, wherein the one or more relays include one or more other UAVs.

16. The apparatus of claim 10, wherein:

the one or more relays include one or more mobile relays; and the one or more locations includes a range of the flight path of the UAV for the one or more mobile relays to follow the UAV.

17. The apparatus of claim 10, wherein the program instructions further cause the processor to:

determine whether the UAV is capable of communicating over a communication network at a predetermined level of quality based on the communication signal distribution;

instruct the UAV to communicate over the communication network without using the one or more relays in response to the UAV being capable of communicating over the communication network at the predetermined level of quality; and instruct the UAV to communicate with at least one of the one or more relays in response to the UAV not being capable of communicating over the communication network at the predetermined level of quality.

18. The apparatus of claim 10, the program instructions further cause the processor to:

determine whether the UAV is capable of directly communicating with a remote controller at a predetermined level of quality;

instruct the UAV to directly communicate with the remote controller without using the one or more relays in response to the UAV being capable of directly communicating with the remote controller at the predetermined level of quality; and instruct the UAV to communicate with the remote controller through at least one of the one or more relays in response to the UAV not being capable of directly communicating with the remote controller at the predetermined level of quality.

* * * * *